United States Patent
Yamato et al.

(10) Patent No.: US 8,374,594 B2
(45) Date of Patent: Feb. 12, 2013

(54) METHOD AND SYSTEM FOR RADIO COMMUNICATIONS USING MOBILE TERMINAL MOVING ROUTE PREDICTION

(75) Inventors: Katsumi Yamato, Chiba (JP); Kiyoshi Toshimitsu, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 581 days.

(21) Appl. No.: 11/673,002

(22) Filed: Feb. 9, 2007

(65) Prior Publication Data

US 2007/0129072 A1 Jun. 7, 2007

Related U.S. Application Data

(62) Division of application No. 09/841,042, filed on Apr. 25, 2001, now Pat. No. 7,257,405.

(30) Foreign Application Priority Data

Apr. 25, 2000 (JP) .................................. 2000-124410

(51) Int. Cl.
*H04Q 7/20* (2006.01)
(52) U.S. Cl. ......................... 455/422.1; 455/436; 455/45
(58) Field of Classification Search .................... 455/45, 455/39
See application file for complete search history.

(56) References Cited

U.S. PATENT DOCUMENTS

| | | | | |
|---|---|---|---|---|
| 6,014,564 A * | 1/2000 | Donis et al. | ................... | 455/436 |
| 6,292,743 B1 | 9/2001 | Pu et al. | | |
| 6,314,369 B1 * | 11/2001 | Ito et al. | ........................ | 701/209 |
| 6,327,471 B1 * | 12/2001 | Song | .............................. | 455/440 |
| 6,349,203 B1 | 2/2002 | Asaoka et al. | | |
| 6,381,463 B1 * | 4/2002 | Tu et al. | ...................... | 455/456.5 |
| 6,385,454 B1 * | 5/2002 | Bahl et al. | ..................... | 455/450 |
| 6,433,737 B2 * | 8/2002 | Katz | .............................. | 342/367 |
| 6,449,484 B1 * | 9/2002 | Grubeck et al. | ............. | 455/450 |
| 6,484,032 B1 * | 11/2002 | Okada | ......................... | 455/456.1 |
| 6,522,875 B1 * | 2/2003 | Dowling et al. | ........... | 455/414.3 |
| 6,542,471 B1 * | 4/2003 | Ito | ................................. | 370/252 |
| 6,564,057 B1 * | 5/2003 | Chun et al. | ................... | 455/437 |
| 6,611,687 B1 * | 8/2003 | Clark et al. | ................ | 455/456.5 |
| 6,617,980 B2 * | 9/2003 | Endo et al. | ................... | 340/905 |
| 2001/0044310 A1 * | 11/2001 | Lincke | ......................... | 455/456 |
| 2002/0010000 A1 | 1/2002 | Chern et al. | | |

FOREIGN PATENT DOCUMENTS

| | | |
|---|---|---|
| JP | 10-70502 | 3/1998 |
| JP | 11-146464 | 5/1999 |

* cited by examiner

*Primary Examiner* — Nay A Maung
*Assistant Examiner* — Erica Fleming-Hall
(74) *Attorney, Agent, or Firm* — Oblon, Spivak, McClelland, Maier & Neustadt, L.L.P.

(57) ABSTRACT

In a radio communication system formed by a plurality of radio base stations having respective service areas and a mobile radio terminal configured to transmit a data transmission request through one radio base station and receive requested data through at least one radio base stations, a radio control station is provided to predict a moving route of the mobile radio terminal according to a terminal location information obtained from the mobile radio terminal upon receiving the data transmission request from the mobile radio terminal through the one radio base station, select those radio base stations which have service areas containing at least a part of the predicted moving route, and deliver requested data to the selected radio base stations.

14 Claims, 22 Drawing Sheets

METHOD AND SYSTEM FOR RADIO COMMUNICATIONS USING MOBILE TERMINAL MOVING ROUTE PREDICTION

CROSS-REFERENCE TO RELATED APPLICATIONS

This application is a Division of and claims the benefit of priority under 35 U.S.C. §120 for U.S. Ser. No. 09/841,042, filed Apr. 25, 2001, and claims the benefit of priority under 35 U.S.C. §119 from Japanese Patent Application No. 2000-124410, filed Apr. 25, 2000, the entire contents of each which are incorporated herein by reference.

BACKGROUND OF THE INVENTION

1. Field of the Invention

The present invention relates to radio communication system and method for providing broadband packet communications with respect to subscribers moving by automobiles, etc.

2. Description of the Related Art

In conjunction with explosive spread of the Internet, it has become feasible to make accesses to images or applications such as execution files through the Internet not only from indoor environments such as home or office but also from outdoor environments such as street or inside a moving automobile. In particular, a service for downloading files containing music, video, advertisement information, etc., through the Internet is expected to be the major way for utilizing the Internet in the outdoor environments.

In the case of utilizing the Internet from the outdoor environment, a subscriber will access the Internet by utilizing a mobile communication system such as that of mobile phone or cellular phone. However, the current transmission bandwidth (about several tens Kbit/sec.) of the mobile communication system is hardly sufficient for comfortably receiving the service through the Internet.

There are also discussions of a next generation radio access system such as IMT-2000 (International Mobile Telecommunications 2000) and MMAC (Multimedia Mobile Access Communication). However, in the IMT-2000, it is possible to realize the communication speed of 2 Mbit/sec. while at rest, but the maximum speed that can be provided during a fast moving by an automobile is only 144 Kbit/sec. Also, the MMAC system can provide the transmission speed of 10 Mbit/sec. per user, but it can only handle a moving speed at a level of the walking speed so that it is impossible to receive services during a fast moving by an automobile.

In addition to such a shortage of the transmission bandwidth at the radio access section, the handover for switching an access target radio base station for a moving subscriber can also be a source of degradation for the performance of the Internet access utilizing the mobile communication system. Namely, when the handover occurs, it is necessary to carry out a procedure for detecting a new access target radio base station, a procedure for establishing connection with this new access target radio base station, a procedure for terminating connection with the previous access target radio base station, as well as a management of the subscriber's move for the purpose of continuing the data transmission to the subscriber.

In the case where the subscriber wishes to receive the downloading service through the Internet, a data server that is the downloading source cannot recognize the radio base station to which the downloading data destined to that subscriber should be sent, until the connection with the new access target radio base station is established. Namely, only after the handover is finished, the data server can recognize the new access target radio base station and restart the transmission of the downloading data to the subscriber through that radio base station if the transmission has not been completed yet. At this point, the time available for the data transmission using the radio base station will become shorter as much as the time required for the handover control becomes longer, and this can cause the lowering of the data transmission speed.

As described above, considering the fact that the standard communication speed in the current mobile communication system and the next generation radio access system currently under the discussions is 10 Mbit/sec. in the wired LAN, the communication speed under the fast moving environment is hardly sufficient for comfortably receiving services through the Internet. Also, the handover control to be executed in conjunction with the occurrence of the handover can be a cause for the lowering of the data transmission speed.

SUMMARY OF THE INVENTION

It is therefore an object of the present invention to provide radio communication system and method in which a fast downloading service can be received comfortably without a failure, even in the case of providing packet communications such as those for the Internet access using a moving body capable of executing a fast moving such as automobile.

According to one aspect of the present invention there is provided a radio communication system, comprising: a plurality of radio base stations having respective service areas; a mobile radio terminal configured to transmit a data transmission request through one radio base station and receive requested data through at least one radio base stations; a radio control station connected with the radio base stations and having: a moving route prediction unit configured to predict a moving route of the mobile radio terminal according to a terminal location information obtained from the mobile radio terminal upon receiving the data transmission request; and a server unit configured to select those radio base stations which have service areas containing at least a part of the moving route predicted by the moving route prediction unit, and deliver the requested data to selected radio base stations.

According to another aspect of the present invention there is provided a radio control station in a radio communication system formed by a plurality of radio base stations having respective service areas and a mobile radio terminal configured to transmit a data transmission request through one radio base station and receive requested data through at least one radio base stations, the radio control station comprising: a moving route prediction unit configured to predict a moving route of the mobile radio terminal according to a terminal location information obtained from the mobile radio terminal upon receiving the data transmission request from the mobile radio terminal through the one radio base station; and a server unit configured to select those radio base stations which have service areas containing at least a part of the moving route predicted by the moving route prediction unit, and deliver requested data to selected radio base stations.

According to another aspect of the present invention there is provided a radio communication method in a radio communication system formed by a plurality of radio base stations having respective service areas and a mobile radio terminal configured to transmit a data transmission request through one radio base station and receive requested data through at least one radio base stations, the radio communication method comprising; predicting a moving route of the mobile radio terminal according to a terminal location information obtained from the mobile radio terminal upon receiving the data transmission request from the mobile radio terminal through the one radio base station at a radio control station; selecting those radio base stations which have service areas containing at least a part of the moving route predicted by the predicting step at the radio control station; and delivering requested data from the radio control station to those radio base stations.

According to another aspect of the present invention there is provided a computer usable medium having computer readable program codes embodied therein for causing a computer to function as a radio control station in a radio communication system formed by a plurality of radio base stations having respective service areas and a mobile radio terminal configured to transmit a data transmission request through one radio base station and receive requested data through at least one radio base stations, the computer readable program codes include: a first computer readable program code for causing said computer to predict a moving route of the mobile radio terminal according to a terminal location information obtained from the mobile radio terminal upon receiving the data transmission request from the mobile radio terminal through the one radio base station; and a second computer readable program code for causing said computer to select those radio base stations which have service areas containing at least a part of the moving route predicted by the moving route prediction unit, and deliver requested data to selected radio base stations.

Other features and advantages of the present invention will become apparent from the following description taken in conjunction with the accompanying drawings.

DETAILED DESCRIPTION OF THE PREFERRED EMBODIMENTS

Figure 1:
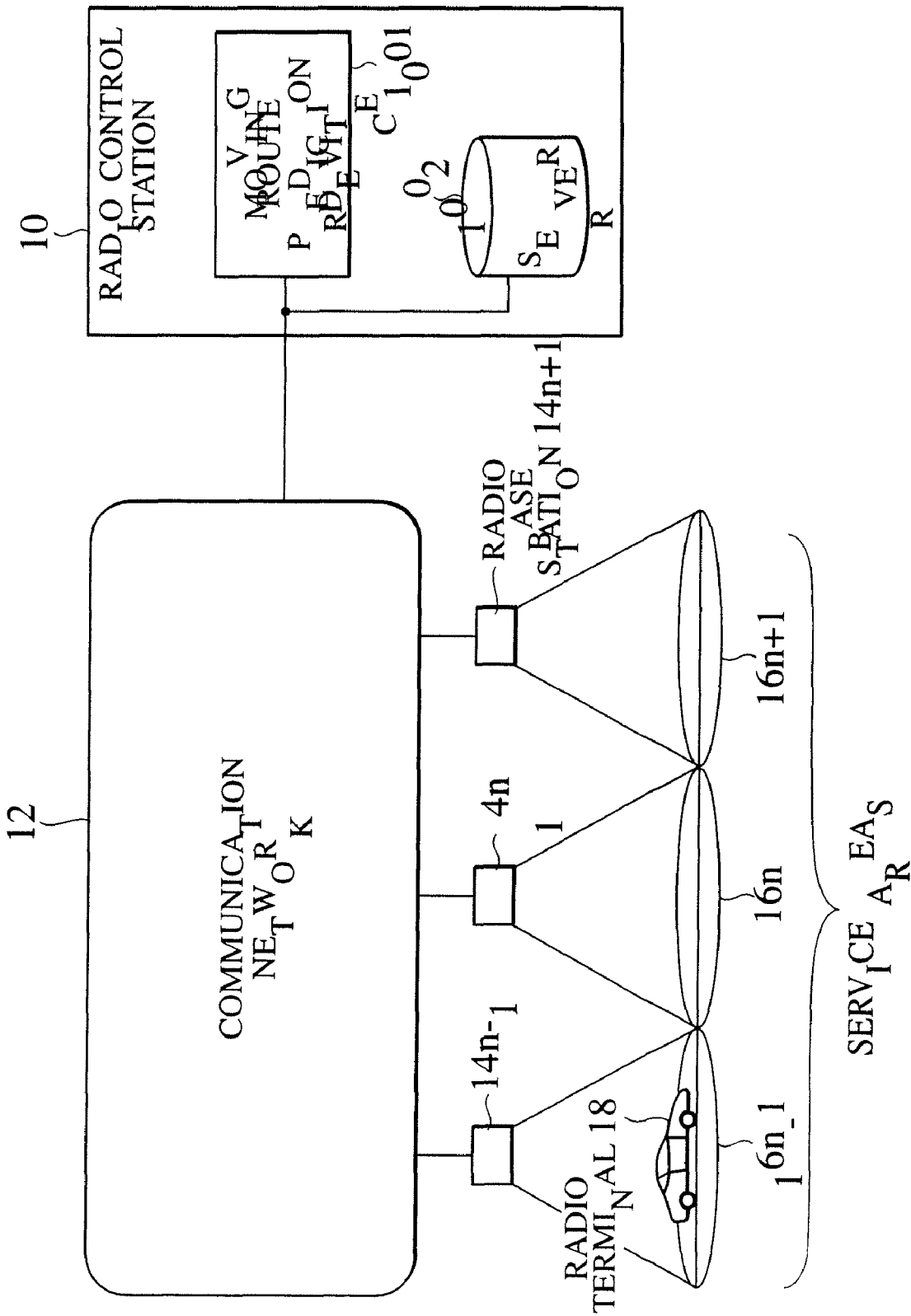
FIG. 1 is a block diagram showing a configuration of a radio communication system according to the first embodiment of the present invention.

Referring now to FIG. 1 to FIG. 23, the embodiments of radio communication system and method according to the present invention will be described in detail. In the following, the same or similar portions will be given the same or similar reference numerals in the drawings.

First Embodiment

FIG. 1 shows a configuration of a radio communication system according to the first embodiment of the present invention. As shown in FIG. 1, this radio communication system comprises: a radio control station 10; a communication network 12 such as the Internet to which the radio control station 10 is connected; a plurality of radio base stations 14$n$−1, 14$n$ and 14$n$+1 for carrying out wired communications with the radio control station 10 through the communication network 12; and a radio terminal 18 for carrying out radio communications with the radio base stations 14$n$−1, 14$n$ and 14$n$+1 while being located in service areas 16$n$+1, 16$n$ and 16$n$+1 of the radio base stations 14$n$−1, 14$n$ and 14$n$+1.

Here, the radio control station 10 is a data delivery center for delivering various types of data (music, video, advertisement information) to the radio terminal 18 of the subscriber. This radio control station 10 at least has a moving route prediction device 1001 for predicting a moving route of the radio terminal 18 and a server 1002 for temporarily storing data requested from the radio terminal 18 and transmitting that data to the radio terminal 18. In FIG. 1, both the moving route prediction device 1001 and the server 1002 are provided inside the radio control station 10, but the present invention is not necessarily limited to this specific case. For example, the moving route prediction device 1001 and the server 1002 can be provided outside the radio control station 10 and connected to the radio control station 10 through the communication network 12.

The radio terminal 18 can be a portable terminal (mobile phone, cellular phone) on an automobile, a train, or other vehicle running on road, railroad, etc. In FIG. 1, the radio terminal is located in the service area $16n-1$ covered by the radio base station $14n-1$. Consequently, the radio terminal 18 transmits the communication data by transmitting/receiving radio signals with respect to the radio base station $14n-1$.

Figure 2:
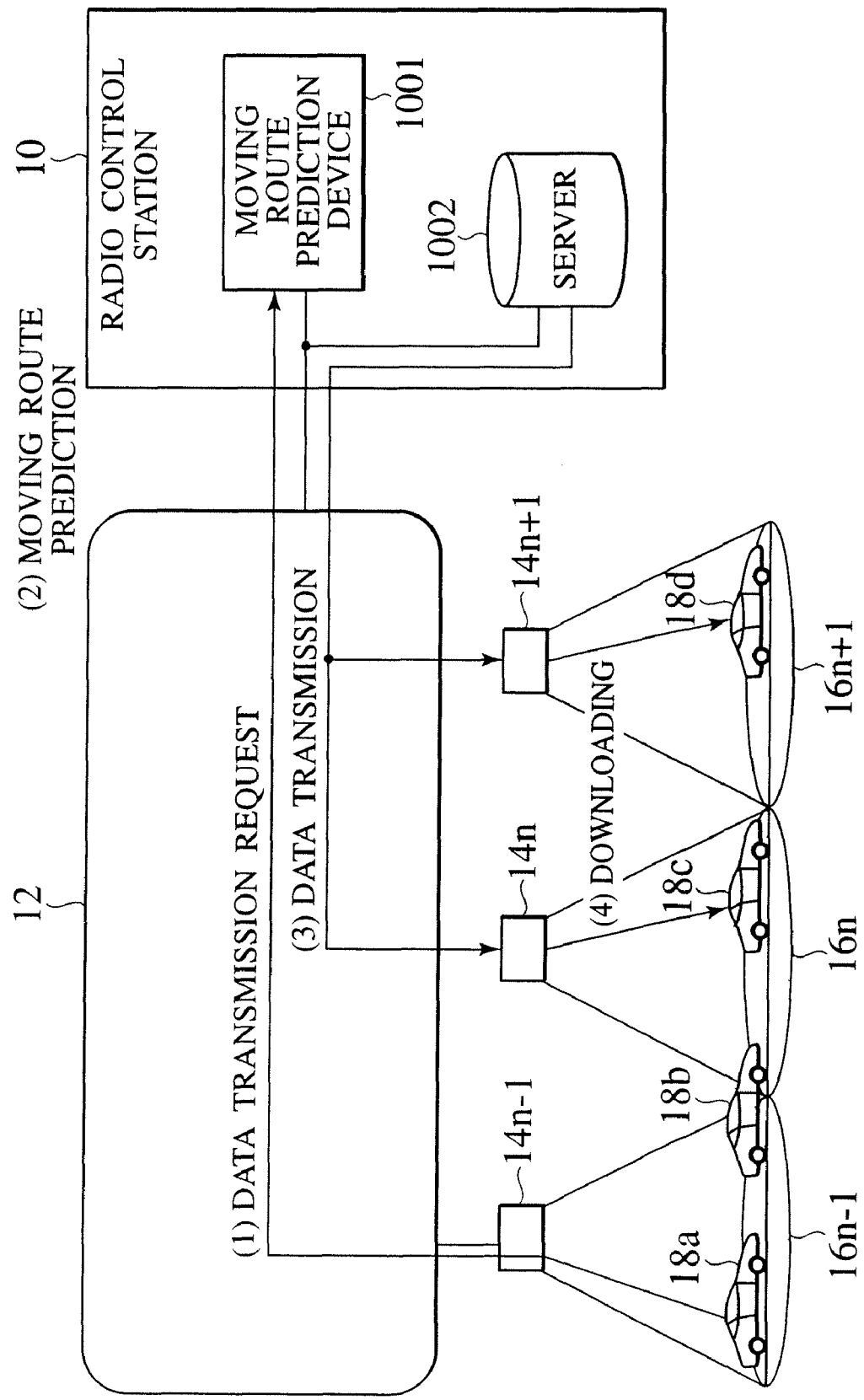
FIG. 2 is a diagram showing an outline of a radio communication method to be carried out in the radio communication system of FIG. 1.
Figure 3:
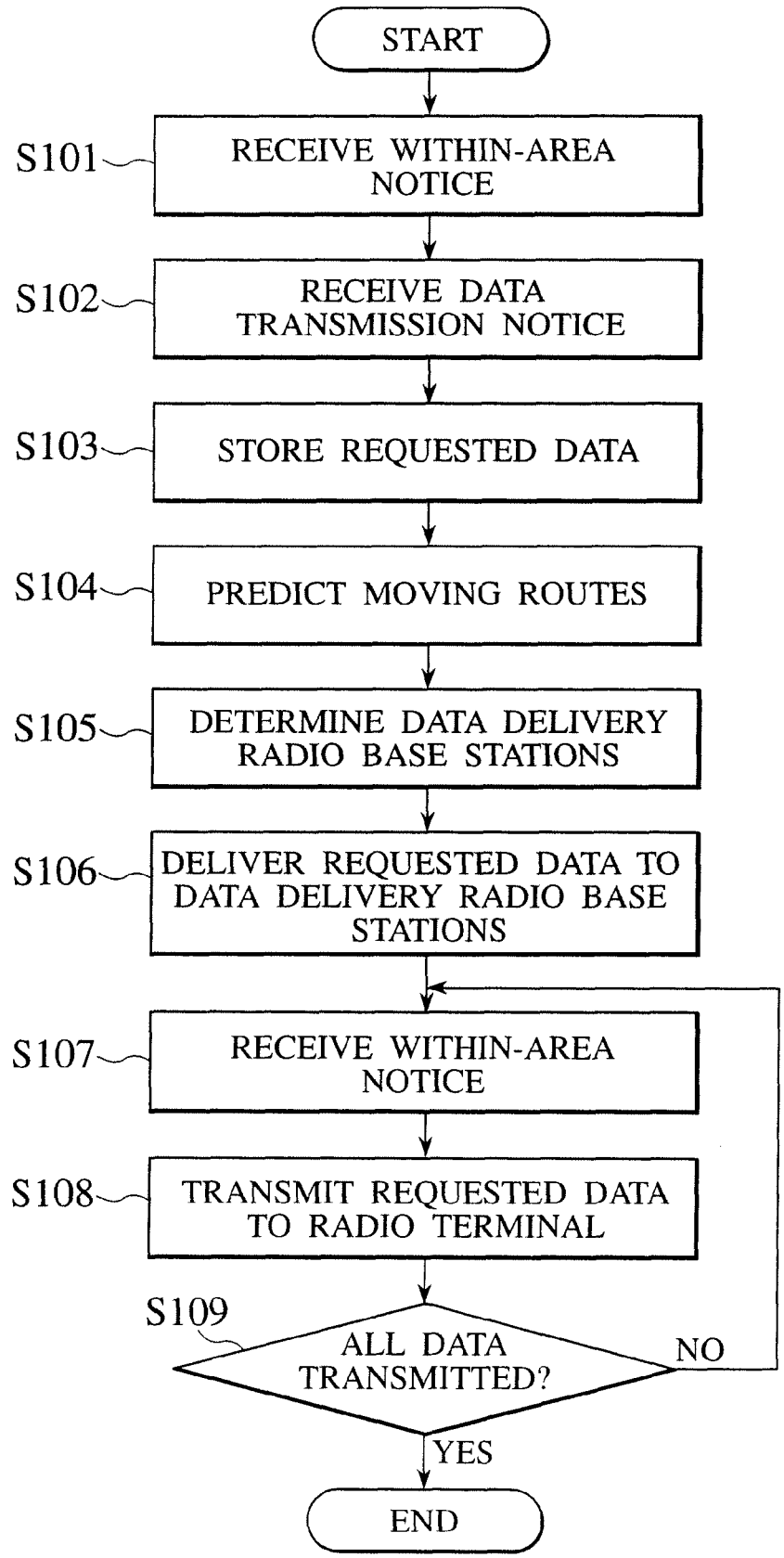
FIG. 3 is a flow chart for a processing procedure of the radio communication method to be carried out in the radio communication system of FIG. 1.
Figure 4:
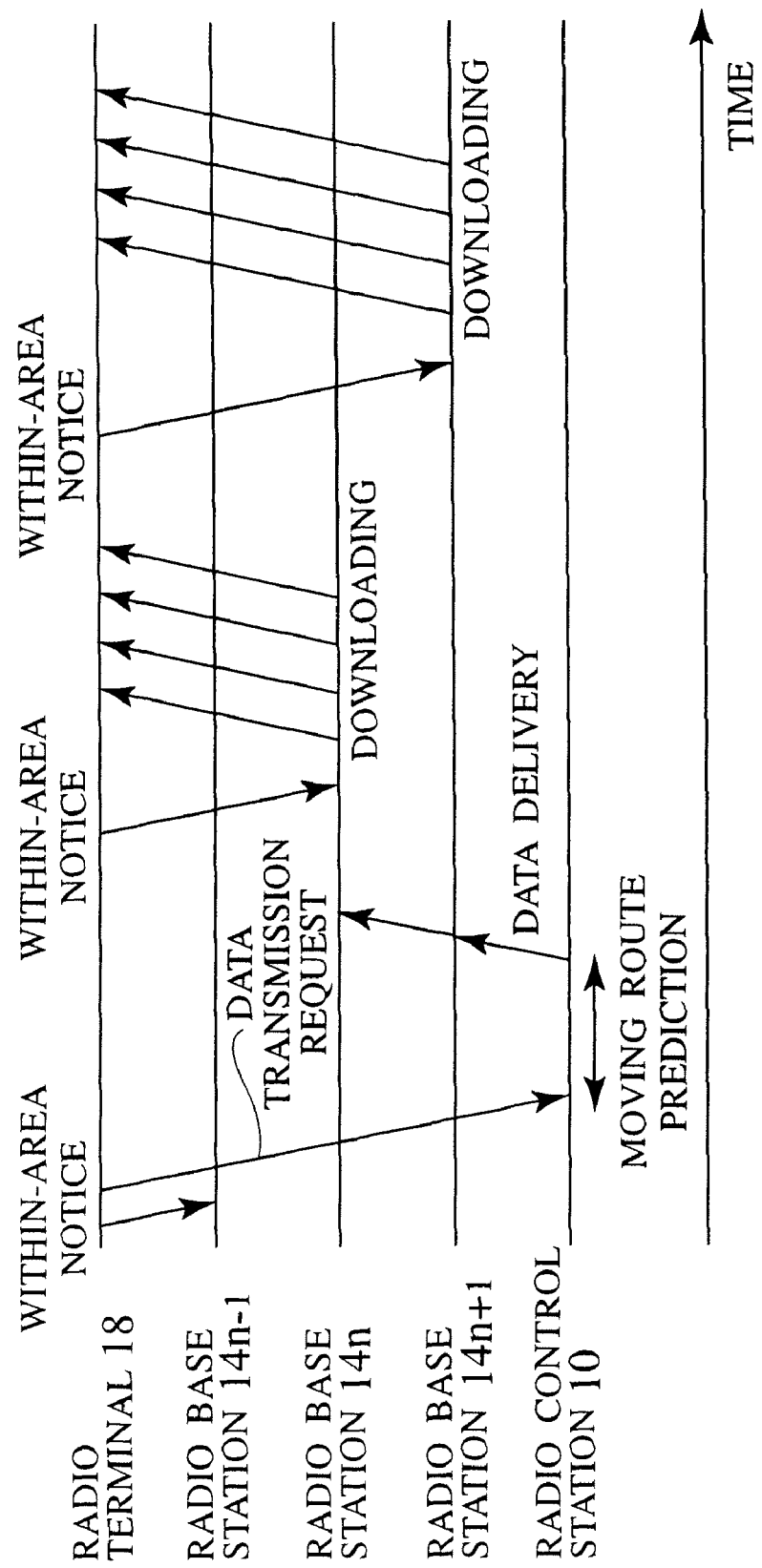
FIG. 4 is a sequence chart for an operation sequence in the radio communication system of FIG. 1 according to the radio communication method of FIG. 3.

Next, with references to FIG. 2 to FIG. 4, the radio communication method according to the first embodiment of the present invention will be described. FIG. 2 shows an outline of this radio communication method, FIG. 3 shows a processing procedure of this radio communication method, and FIG. 4 shows an operation sequence among the radio control station 10, the radio base stations 14 and the radio terminal 18. In FIG. 2 to FIG. 4, it is assumed that the radio terminal 18 sequentially moves from a location of the radio terminal $18a$ to locations of the radio terminals $18b$, $18c$ and $18d$ as the time elapses.

(1) When the radio terminal 18 enters the service area $16n-1$ of the radio base station $14n-1$, the radio terminal 18 notifies a message indicating that it is located within the service area $16n-1$ to the radio base station $14n-1$ (step S101 of FIG. 3). In the following, the processing for notifying this message will be referred to as "within-area notice". Also, the radio terminal 18 carries out a connection set up for the purpose of carrying out communications with the radio base station $14n-1$ according to the need.

(2) Next, the radio terminal 18 transmits a message indicating a data transmission request to the radio control station 10 (step S102 of FIG. 3). This data transmission request contains an identifier for indicating the radio base station with which the radio terminal 18 is currently capable of communicating. The radio control station 10 can recognize the radio base station with which the radio terminal 18 is currently capable of communicating, from the identifier contained in this data transmission request. Here, the radio control station 10 recognizes that the radio terminal 18 is currently capable of communicating with the radio base station $14n-1$.

(3) Upon receiving the data transmission request from the radio terminal 18, the radio control station 10 takes out requested data from a prescribed database (not shown), and temporarily stores the requested data in the server 1002 (step S103 of FIG. 3).

(4) When the storing of the data into the server 1002 is finished, the radio control station 10 predicts a moving route of the radio terminal 18 using the moving route prediction device 1001 (step S104 of FIG. 3). The moving route prediction device 1001 predicts the moving route of the radio terminal 18 according to the data transmission request transmitted from the radio terminal 18.

Figure 5:
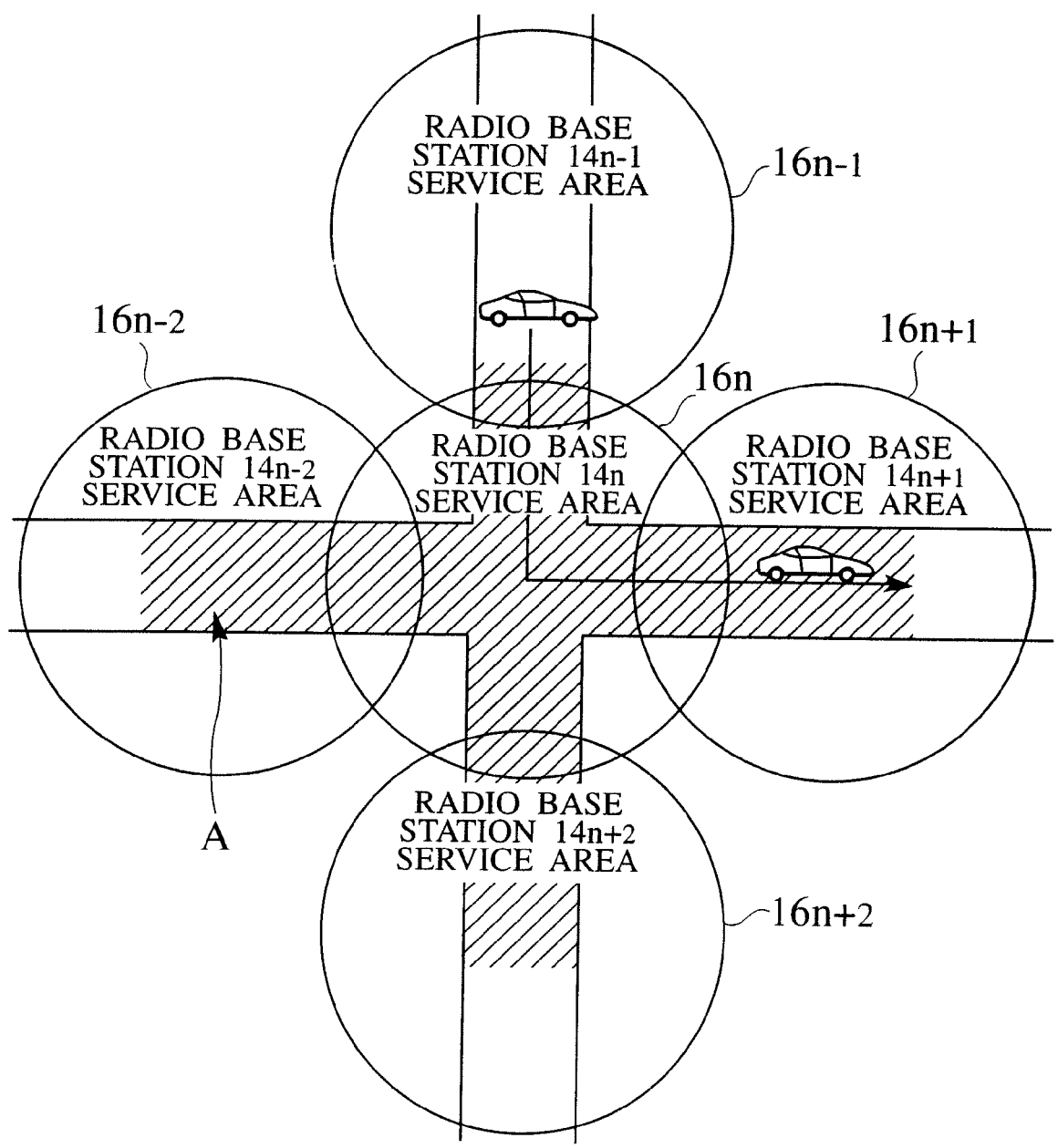
FIG. 5 is a diagram showing an exemplary case of a moving route prediction by a moving route prediction device in the radio communication system of FIG. 1.

The moving route prediction can be realized as follows, for example. FIG. 5 shows an exemplary situation in which the moving route is to be predicted by the moving route prediction device 1001. In FIG. 5, five radio base stations $14n-2$, $14n-1$, $14n$, $14n+1$ and $14n+2$ including the radio base stations $14n-1$, $14n$ and $14n+1$ shown in FIG. 1 are arranged, and it is assumed that the radio terminal 18 moves from the service area $16n-1$ of the radio base station $14n-1$ through the service area $16n$ of the radio base station $14n$ to the service area $16n+1$ of the radio base station $14n+1$ as the time elapses.

In this example of FIG. 5, the radio control station recognizes that the radio terminal 18 is currently located in the service area $16n-1$ of the radio base station $14n-1$ by receiving the data transmission request transmitted from the radio terminal 18.

Then, the moving route prediction device 1001 of the radio control station 10 searches for movable areas of the 35 radio terminal 18 starting from the service area $16n-1$ of the radio base station $14n-1$. At the same time, the radio control station 10 estimates a time required in delivering the data requested by the radio terminal 18 to the radio terminal 18. Then, all the movable areas of the radio terminal 18 within the estimated delivery time are set as the moving route candidates. Here, at a time of estimating the time required for the data delivery with respect to the radio terminal 18, it is preferable to account for the level of congestion in the communication network 12. In FIG. 5, a shaded region A is the predicted moving routes of the radio terminal 18.

(5) The radio control station 10 determines the radio base stations to which the data are to be delivered (data delivery radio base stations) from the moving routes of the radio terminal 18 predicted by the moving route prediction device 1001 (step S105 of FIG. 3). For example, when the moving routes of the radio terminal 18 are predicted as indicated in FIG. 5, the radio base stations $14n-2$, $14n$, $14n+1$ and $14n+2$ responsible for the service areas $16n-2$, $16n$, $16n+1$ and $16n+2$ that cover these moving routes are judged as the radio base stations from which the downloading of the requested data with respect to the radio terminal 18 is possible. Then, the radio control station 10 delivers the requested data stored in the server 1002 earlier to the radio base stations $14n-2$, $14n$, $14n+1$ and $14n+2$ (step S106 of FIG. 3).

(6) When the radio terminal 18 moves into the service area $16n$ of the radio base station $14n$, the radio terminal 18 transmits the within-area notice indicating that it is located within the service area $16n$ to the radio base station $14n$ (step S107 of FIG. 3). Upon receiving the within-area notice, the radio base station $14n$ carries out a connection set up for the purpose of carrying out communications with the radio terminal 18.

(7) The radio base station $14n$ recognizes that the radio terminal 18 is located within the service area $16n$ by receiving the within-area notice from the radio terminal 18. Then, the radio base station $14n$ transmits the requested data delivered from the radio control station 10 earlier to the radio terminal 18 (step S108 of FIG. 3).

(8) In the case where it is impossible to download all the data while the moving radio terminal 18 is located within the service area $16n$ of the radio base station $14n$ (step S109 NO in FIG. 3), the radio terminal 18 transmits the within-area notice to the radio base station $14n+1$ next (step S107 of FIG. 3). Upon receiving the within-area notice, the radio base station $14n+1$ carries out a connection set up for the purpose of carrying out communications with the radio terminal 18.

(9) The radio base station $14n+1$ recognizes that the radio terminal 18 is located within the service area $16n+1$ by receiving the within-area notice from the radio terminal 18. Then, the radio base station $14n+1$ transmits the requested data delivered from the radio control station 10 earlier to the radio terminal 18 again (step S108 of FIG. 3).

(10) In the case where it is possible to download all the data while the moving radio terminal 18 is located within the service area $16n+1$ of the radio base station $14n+1$ (step S109 YES in FIG. 3), the processing is terminated.

Note that, in FIG. 5, the data are also delivered from the radio control station 10 to the radio base stations $14n-2$ and 14n+2 as well. However, as a result of the fact that the radio terminal 18 did not pass through the service area 16n-2 of the radio base station 14n-2 and the service area 16n+2 of the radio base station 14n+2, the data transmission from the radio base stations 14n-2 and 14n+2 to the radio terminal 18 will not be carried out.

Second Embodiment

Next, the second embodiment of the present invention will be described in detail.

In the first embodiment described above, the location of the radio terminal 18 is comprehended by identifying the radio base station 14 that is connected to the radio terminal 18. Namely, the radio control station 10 detects the location of that radio base station 14 by acquiring the identifier of the radio base station 14 contained in the data transmission request transmitted from the radio terminal 18. Then, the location of the radio terminal 18 is identified as the service area 16 of that radio base station 14 according to the detected information. However, in the radio access system such as IMT-2000, the service area of the radio base station is expected to have a radius of about 1 Km (or more than several Km in some cases), so that the use of such a wide range area as the location information of the radio terminal can be problematic.

In this second embodiment, a GPS (Global Positioning System) function is additionally provided in the radio terminal 18 of the first embodiment, such that the location information (longitude, latitude) of the radio terminal 18 can be obtained more accurately. As a result, according to the second embodiment, the requested data can be transmitted to the radio terminal more quickly and surely.

Figure 6:
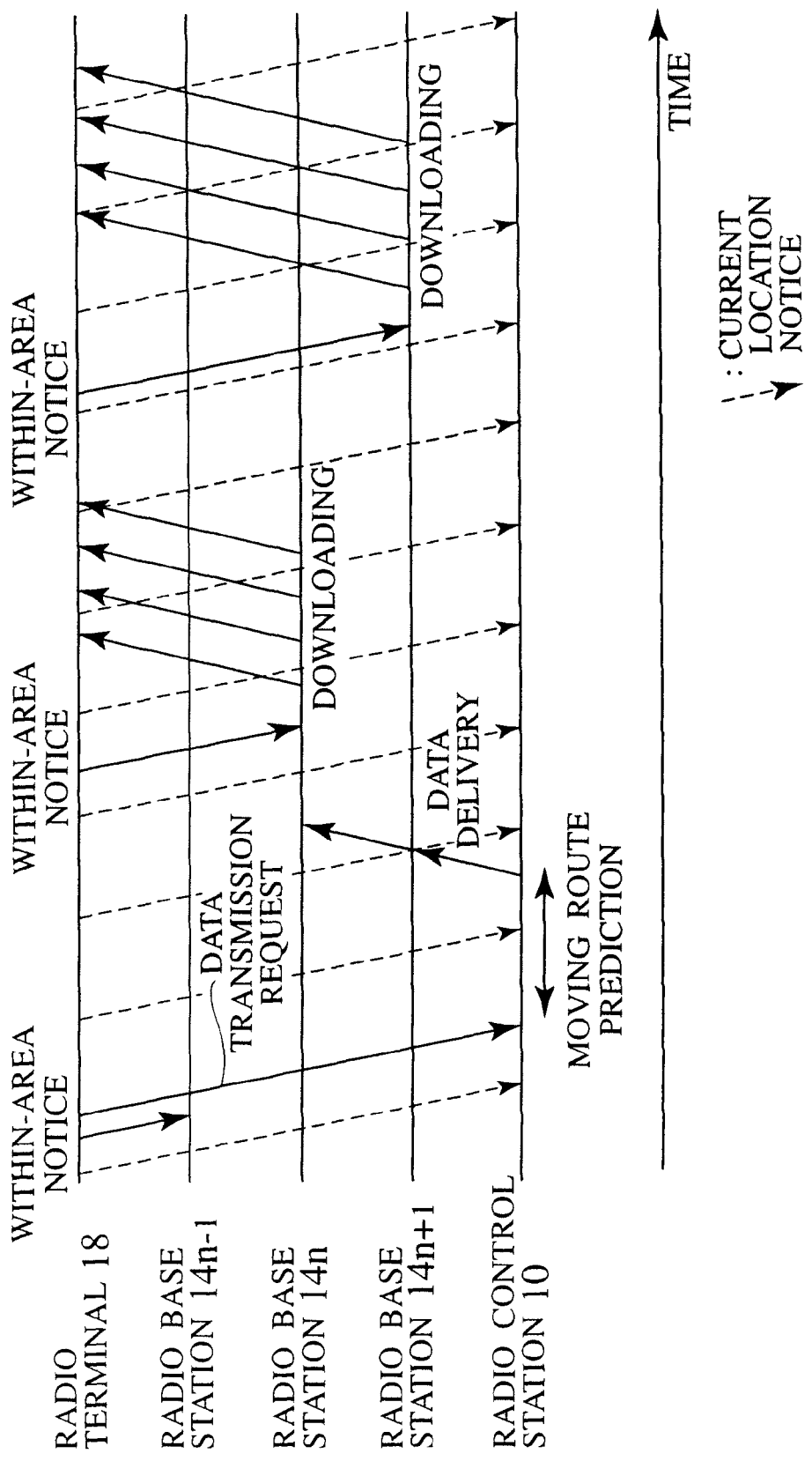
FIG. 6 is a sequence chart for an operation sequence of a radio communication method according to the second embodiment of the present invention.

FIG. 6 shows an operation sequence among the radio control station 10, the radio base stations 14 and the radio terminal 18 according to the second embodiment. In the second embodiment, the radio terminal 18 is equipped with the GPS function such as that used in the car navigation system or the like. As shown in FIG. 6, the GPS equipped radio terminal 18 calculates the longitude and the latitude by receiving radio signals arriving from a GPS satellite. Then, the current location of the radio terminal 18 indicated by the calculated longitude and latitude is notified to the radio control station 10 periodically (current location notice), so that the radio control station 10 can identify the accurate location of the radio terminal 18.

According to the second embodiment, the radio terminal 18 notifies the location information according to the GPS to the radio control station 10 periodically, so that the radio control station 10 can comprehend the current location of the radio terminal 18 at higher precision. For this reason, the radio control station 10 can make a more reliable prediction for the moving route of the radio terminal 18, Third Embodiment Next, the third embodiment of the present invention will be described in detail.

In the first and second embodiment described above, the moving route of the radio terminal 18 is predicted according to the location information notified from the radio terminal 18. In this third embodiment, a more accurate moving route prediction for the radio terminal 18 is realized by utilizing in addition traffic information such as a moving speed of the radio terminal 18, the legal speed limit of the moving route, a current moving speed of vehicles existing on the moving route, a signal change pattern of traffic signals existing on the moving route, etc.

Figure 7:
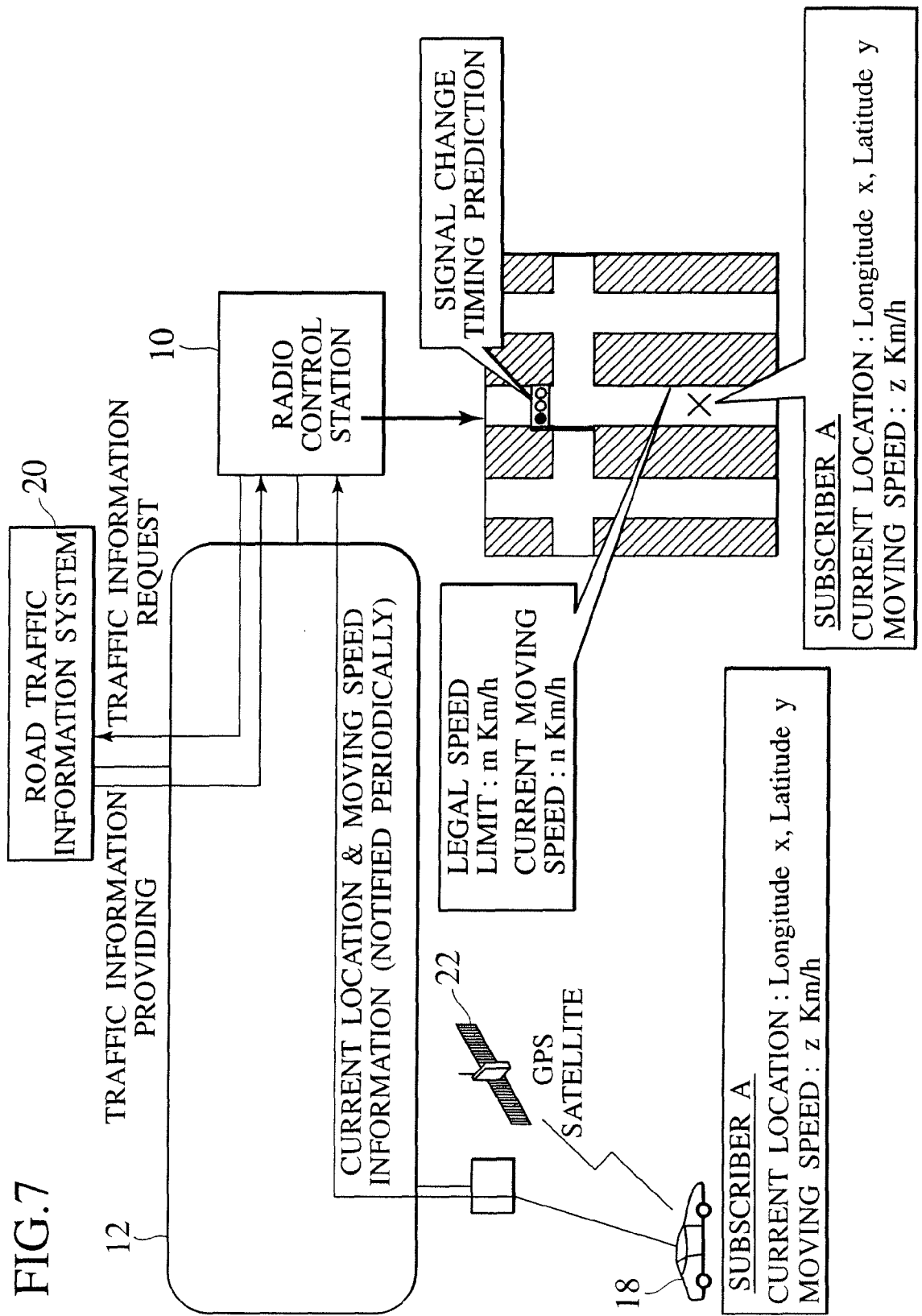
FIG. 7 is a block diagram showing a configuration of a radio communication system according to the third embodiment of the present invention.

FIG. 7 shows an exemplary configuration of the radio communication system according to the third embodiment. In this third embodiment, the moving speed of the radio terminal 18 (subscriber A) is either detected by a sensor (electromagnetic sensor, optical sensor, etc.) provided on the radio terminal 18 or given by a speed value indicated by the speedometer of the vehicle when the radio terminal 18 is on the vehicle, for example. Then, this moving speed is notified to the radio control station 10 periodically along with the location information according to the GPS. The radio control station 10 searches for the traffic information regarding an area in which the radio terminal 18 is currently located, according to the notified information regarding the current location and the moving speed, and predicts the moving route of the radio terminal 18 according to the obtained information.

In the third embodiment shown in FIG. 7, the above described traffic information is managed in a road traffic information system 20 connected to the communication network 12. The radio control station 10 requests the current traffic information to the road traffic information system 20 according to the need, and in response to this request, the road traffic information system 20 provides the current traffic information to the radio control station 10. Note that, in FIG. 7, the road traffic information system 20 is provided at a location physically different from that of the radio control station 10, but it is also possible to provide the road traffic information system 20 inside the radio control station 10 as a constituent element of the radio control station 10.

Here, the moving route prediction by the radio control station 10 requires the estimation of an amount of data to be delivered to each radio base station 14 that is the connection target of the radio terminal 18. This amount of data indicates an amount of data that can be downloaded to the radio terminal 18 while the radio terminal 18 is located within the service area 16 of each radio base station 14. In the third embodiment, this amount of data is predicted according to an estimated time for the radio terminal 18 to stay in each service area 16, the data transmission speed with respect the radio terminal 18, and a procedure for transmitting data to the radio terminal 18 within the service area 16.

Figure 8:
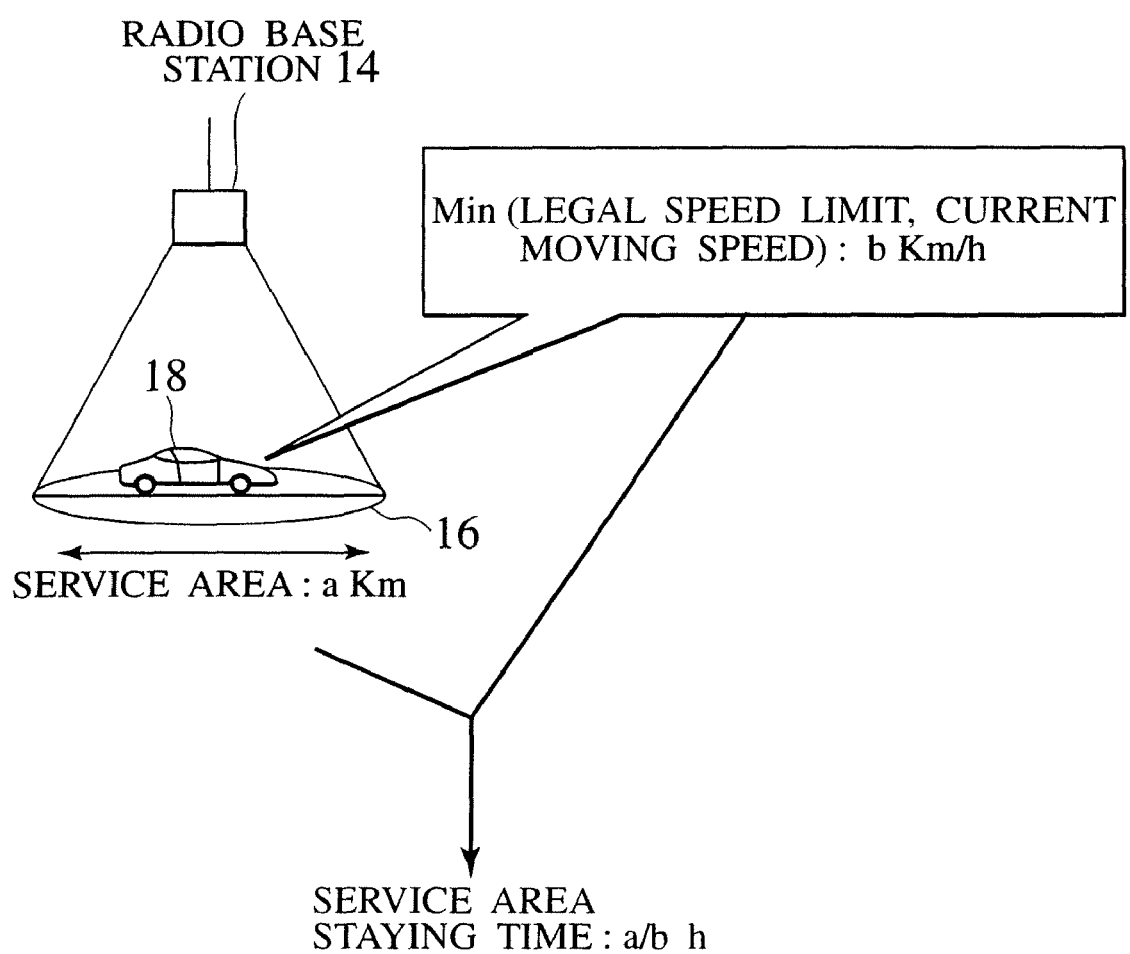
FIG. 8 is a diagram showing an exemplary case of a service area staying time calculation in the radio communication system of FIG. 7.

First, the method for calculating the estimated staying time of the radio terminal 18 will be described. FIG. 8 shows an exemplary situation for calculating the service area stating time. In FIG. 8, the radius of the service area 16 of the radio base station 14 is assumed to be "a Km", while the moving speed of the radio terminal 18 passing through the service area 16 is assumed to be "b Km/h". Here, the moving speed of the radio terminal 18 is set to be the smaller one of the following two speeds:

(a) the legal speed limit within the service area obtained from the traffic information; and (b) the current moving speed of the other vehicle (radio terminal) existing in the service area.

This speed setting is used in order to account for the state involving the vehicle flow slower than the legal speed limit due to the occurrence of the traffic jam within the service area.

As shown in FIG. 8, when the speed by which the radio terminal 18 of the subscriber passes through the service area 16 is "b Km/h", the time for which the radio terminal 18 exists within the service area 16 is given by "a/b" hour. The radio control station 10 obtained the amount of data that can be completely downloaded to the radio terminal 18 within this time, according to the calculated staying time. Note that the moving speed of the radio terminal 18 may be given by the moving speed measured by the radio terminal 18 that is periodically notified from the radio terminal 18 along with the location information.

Next, the procedure for transmitting data to the radio terminal 18 will be described. When the radio terminal 18 enters the service area 16 of the radio base station 14, the radio terminal 18 notifies a message indicating that it is currently located within the service area 16 of the radio base station 14, to that radio base station 14 (within-area notice). The radio base station 14 starts the downloading for transmitting the data delivered from the radio control station 10 in advance, to the radio terminal 18 upon receiving this notice.

Figure 9:
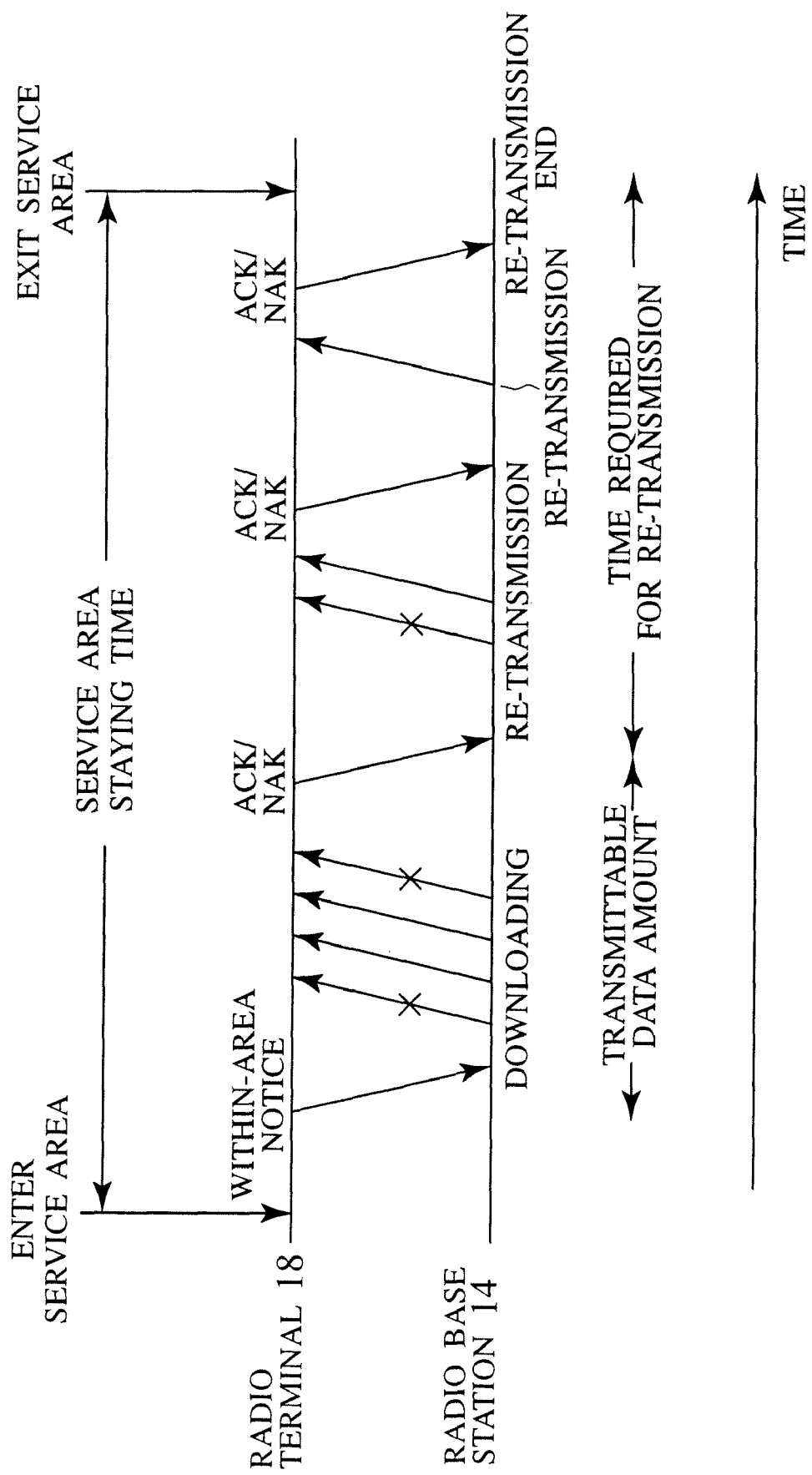
FIG. 9 is a sequence chart for an operation sequence in the radio communication system of FIG. 7 according to a first data transmission procedure.

Now, in general, in the case of carrying out communications using a radio channel, there is a problem that the propagation loss varies largely due to the influence of the fading caused by the multi-path propagation such that the reliability of the transmission is considerably degraded at sections where the receiving level drops significantly. This phenomenon becomes particularly prominent in the case where the radio terminal 18 is moving fast. For this reason, the possibility for the radio terminal 18 to be able to receive all the data correctly while staying within the service area 16 of the radio base station 14 can be unlimitedly low, and as a result, some data of the downloading data may be lost. In order to prevent this loss of some data of the downloading data, the following data transmission procedure can be adopted, for example. FIG. 9 shows an operation sequence for the first procedure for transmitting data from the radio base station 14 to the radio terminal 18. As shown in FIG. 9, in this first data transmission procedure, the radio terminal 18 notifies information (ACK, acknowledgement) indicating that the downloading data were received correctly, or information (NAK, negative acknowledgement) indicating that the downloading data were not received correctly, to the radio base station 14. When NAK is received, the radio base station 14 re-transmits that downloading data that were not correctly received, to the radio terminal 18 (re-transmission control).

Figure 10:
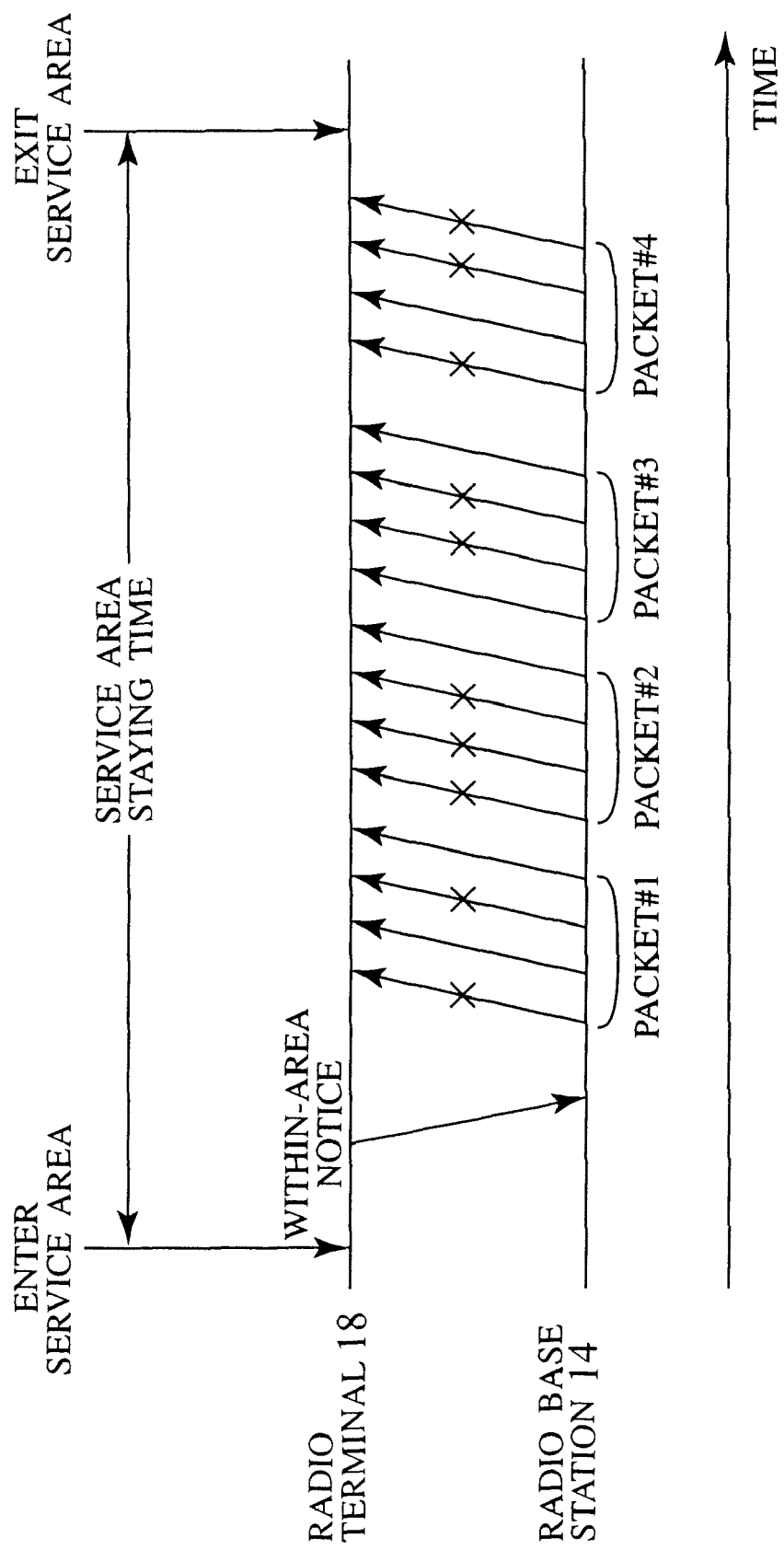
FIG. 10 is a sequence chart for an operation sequence in the radio communication system of FIG. 7 according to a second data transmission procedure.

It is also possible to adopt the following data transmission procedure. FIG. 10 shows an operation sequence for the second procedure for transmitting data from the radio base station 14 to the radio terminal 18. As shown in FIG. 10, in this second data transmission procedure, the radio base station 14 transmits each packet constituting the downloading data repeatedly for a plurality of times, to the radio terminal 18 (redundant transmission control). FIG. 10 shows an exemplary case of transmitting each packet four times repeatedly to the radio terminal 18.

It is also possible to adopt the third data transmission procedure in which the first and second data transmission procedures described above are executed simultaneously. Namely, in the third data transmission procedure, the radio base station 14 transmits each packet repeatedly for a plurality of times to the radio terminal 18. Then, the radio terminal notifies whether each packet that is transmitted for a plurality of times was received correctly at least once or not, to the radio base station 14 using ACK or NAK.

Using the re-transmission control and the redundant transmission control described above, it becomes possible for the radio terminal 18 to receive the highly reliably downloading service from the radio base station 14.

Now, the amount of downloading data that can be transmitted to the radio terminal 18 in the service area 16 of the radio base station 14 must be determined by accounting for the time required for the re-transmission control or the redundant transmission control described above. For this reason, the radio control station 10 estimates an error rate of the data transmitted to the radio terminal 18 according to the propagation characteristics of the radio channel in the service area 16 of the target radio base station 14. Then, the time required for the re-transmission control to be executed in order to receive all the downloading data correctly is predicted in the case of executing the re-transmission control shown in FIG. 9. Also, the number of times for repeatedly transmitting each packet in order to receive all the downloading data correctly is predicted, and then the time required for doing that is predicted, in the case of executing the redundant transmission control shown in FIG. 10.

The time for which the downloading at the radio base station 14 is possible is then set as a time obtained by subtracting the time required for the re-transmission control and/or the time required for the redundant transmission control from the staying time within the service area 16 of the radio base station 14. Then, the amount of downloading data that can be transmitted within that time is estimated as the amount of data that can be downloaded at that radio base station 14.

Figure 11:
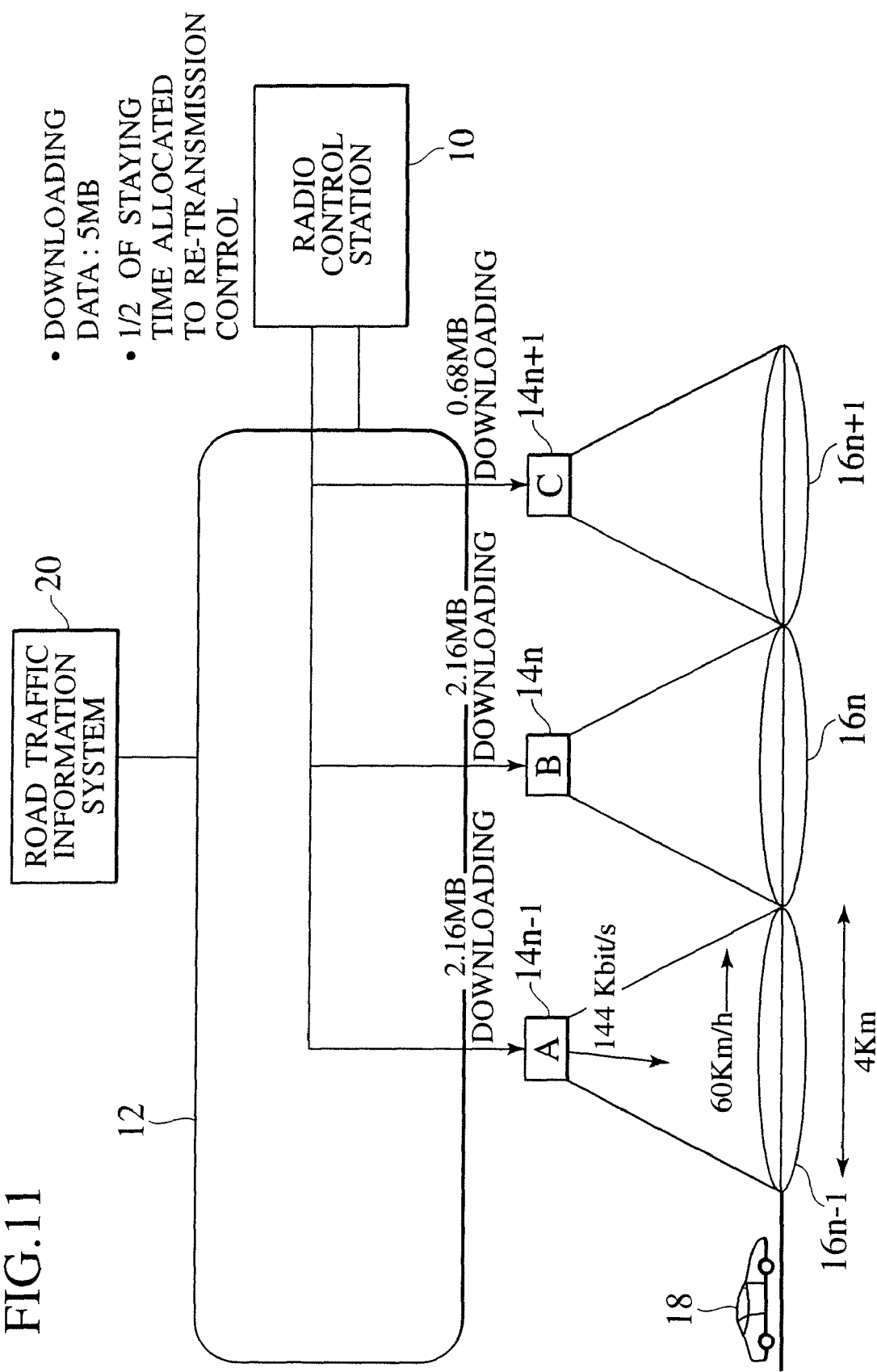
FIG. 11 is a diagram showing an outline of a radio communication method to be carried out in the radio communication system of FIG. 7.

Next, with reference to FIG. 11, the radio communication method according to the third embodiment will be described. FIG. 11 shows an outline of the radio communication method according to the third embodiment. In FIG. 11, it is assumed that the radio terminal 18 receives the service as defined by the IMT-2000.

In FIG. 11, the radio terminal 18 is requesting the downloading of data in amount of 5 Mbytes to the radio control station 10. Also, each one of the radio base stations 14$n$-1, 14$n$ and 14$n$+1 as well as the other radio base stations not shown in the figure is providing services at the data communication speed of 144 Kbit/sec. for the fast moving case as defined by the IMT-2000. Each of the service areas 16$n$-1, 16$n$ and 16$n$+1 is a circular region with a 4 Km diameter centered around the radio base station 14. When the legal speed limit and the current moving speed within the service area 16 are both 60 Km/h, the staying time of the radio terminal 18 within this service area 16 can be predicted as 4/60 hour, i.e., 240 sec.

Then, when the radio control station 10 judges to allocate ½ of that staying time to the re-transmission control described above, for example, the downloading possible time is given by 120 sec. Consequently, the amount of data that can be downloaded at one radio base station 14 is 144 Kbit/sec.× 120 sec.=17280 Kbits, i.e., 2.16 Mbytes. The radio terminal 18 is requesting the downloading of the data in amount of 5 Mbytes, so that the radio control station 10 determines the delivery of this downloading data to three consecutive radio base stations.

Note that the data transmission speed of the communications between the radio base station 14 and the radio terminal 18 varies according to the radio channel utilization state at the radio base station 14. For this reason, the data transmission speed to be used at a time of estimating the amount of data that can be downloaded should preferably be set by accounting for the radio channel utilization rate at that point. Also, a ratio of the staying time that is to be allocated to the re-transmission control may be adjusted whenever necessary at the radio control station 10 according to the data error states of the downloading operations carried out in the past.

Fourth Embodiment

Next, the fourth embodiment of the present invention will be described in detail.

This fourth embodiment is directed to a method for selecting the radio base station to deliver the downloading data to the radio terminal 18 in the case where a crossing with a traffic signal exists on the predicted moving route of the radio terminal 18.

Figure 12:
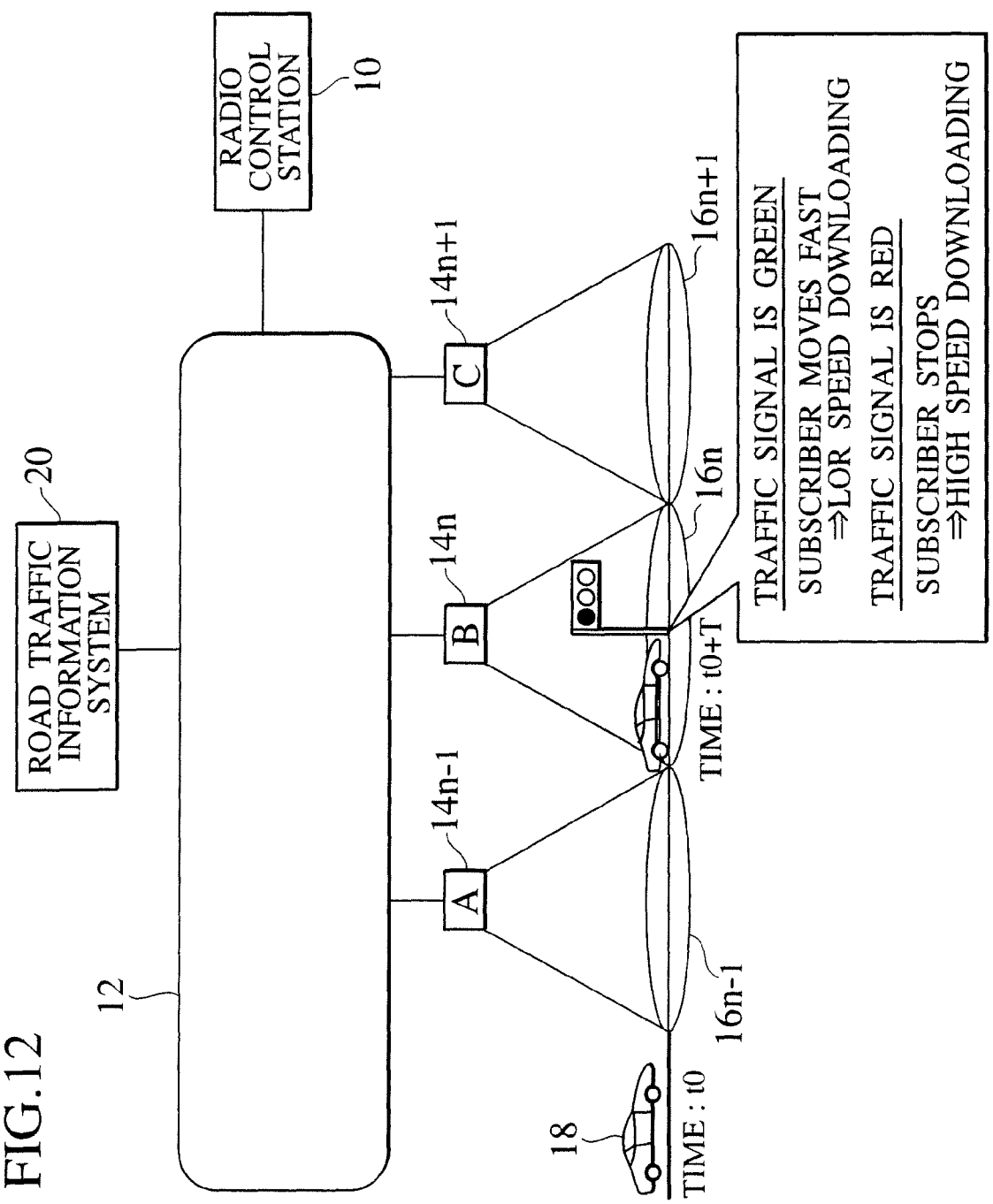
FIG. 12 is a diagram showing an outline of a radio communication method according to the fourth embodiment of the present invention in one exemplary case.

FIG. 12 shows an exemplary case where the radio terminal 18 that made the data transmission request at time t0 passes through a crossing with a traffic signal at time t0+T.

In FIG. 12, the radio control station 10 can easily predict a time at which the radio terminal 18 passes the crossing with the traffic signal, from a distance from the combination. current location of the radio terminal 18 to that crossing, and the moving speed of the radio terminal 18 (which is the smaller one of the legal speed limit on a route between these two points and the current moving speed of vehicles existing on that route). Also, the which signal light of the traffic signal will be on when the radio terminal 18 reaches to the crossing can be predicted by receiving information regarding the signal change pattern of the traffic signal from the road traffic information system 20 because the traffic signal changes the signal light periodically according to a prescribed signal change pattern.

For example, in FIG. 12, when the radio control station 10 predicts that the signal light of the traffic signal at a time of the arrival of the radio terminal 18 to the crossing will be green, it can be expected that the radio terminal 18 will not stop at that crossing and will continue to move fast as before. In this case, the radio base station 14 to deliver the downloading data is selected by predicting the moving route of the radio terminal 18 without taking the traffic signal into consideration, similarly as in the case of the third embodiment described above.

On the other hand, when the radio control station 10 predicts that the signal light of the traffic signal at a time of the arrival of the radio terminal 18 to the crossing will be red, it can be expected that the radio terminal 18 will stop at that crossing. While the radio terminal 18 is stopping, the data communication speed for radio signals from the radio base station 14 to the radio terminal 18 can be made faster than the data communication speed in the case where the radio terminal 18 is moving fast.

For example, in the case of utilizing the IMT-2000, the data communication speed at a time of the fast moving is 144 Kbit/sec. whereas the data communication speed at rest can be as high as 2 Mbit/sec. Moreover, while stopping, it is even possible to receive the service at the data communication speed of 10 Mbit/sec. that is provided by the MMAC system.

Figure 13:
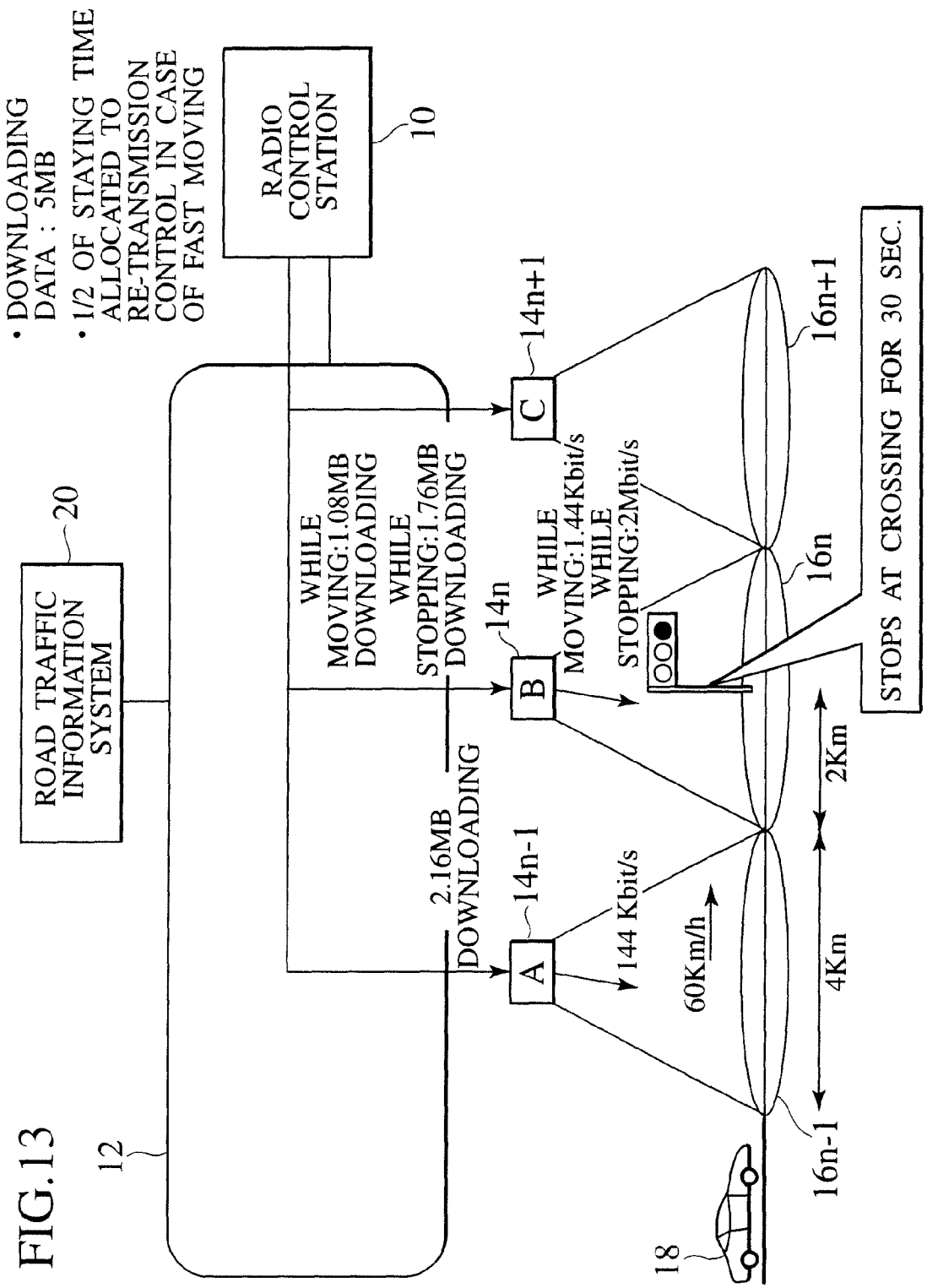
FIG. 13 is a diagram showing an outline of a radio communication method according to the fourth embodiment of the present invention in another exemplary case.

FIG. 13 shows an exemplary case of estimating the amount of data that can be downloaded at each radio base station and predicting the moving route according to the estimated amount of data, when the signal light of the traffic signal at the crossing on the moving route is predicted as red. In FIG. 13, it is assumed that the radio terminal 18 receives the service as defined by the IMT-2000.

In FIG. 13, the radio terminal 18 is requesting the downloading of data in amount of 5 Mbytes to the radio control station 10. Over the distance of 6 Km since the data transmission request is made until the radio terminal 18 reaches to the crossing where it is expected to stop, the radio terminal 18 receives the service at the data communication speed of 144 Kbit/sec. for the fast moving case as defined by the IMT-2000. Assuming that the radio terminal 18 is moving at the speed of 60 Km/h, the amount of data that can be downloaded at the service area 16$n$−1 of the radio base station 14$n$−1 is 2.16 Mbytes. In addition, the service is provided to the radio terminal 18 also at 144 Kbit/sec. even over the distance of 2 Km until the radio terminal 18 reaches to the crossing, and the amount of data that can be downloaded while moving fast within the service area 16$n$ of the radio base station 14$n$ is 1.08 Mbytes.

Then, during 30 seconds for which the radio terminal 18 stops at the crossing, the service is provided to the radio terminal 18 at the data communication speed of 2 Mbit/sec. for the stopping case as defined by the IMT-2000. The remaining amount of the downloading data is 5−2.16−1.08=1.76 Mbytes, so that using the data delivery at 2 Mbit/sec., the downloading can be completed in 1.76×8 (Mbits)/2(Mbit/sec.)=7.04 seconds of the time.

Consequently, the radio control station 10 determines the delivery of 2.16 Mbytes of the downloading data to the radio base station 14$n$−1 and the delivery of 2.84 Mbytes of the downloading data to the radio base station 14$n$.

Note that, in FIG. 13, at a time of estimating the amount of downloading data while stopping, the time to be allocated to the re-transmission control is not taken into consideration because the reliability of the data transmission through the radio channel improves considerably while stopping compared with the case of the fast moving. Of course, it is also possible to estimate the amount of downloading data by taking the time to be allocated to the re-transmission control into consideration.

In the example of FIG. 13, the downloading of the data is carried out both while the radio terminal 18 is moving and while the radio terminal 18 is stopping, but it is also possible to carry out the downloading of the data only while the radio terminal 18 is stopping, without providing any data while the radio terminal 18 is moving. In this case, the data communication at the faster speed can be provided compared with the data communication under the environment where the radio terminal 18 is moving fast, and the possibility for causing the loss of the downloading data due to the propagation loss on the radio channel becomes low so that it becomes possible to provide the more reliable downloading service in shorter time.

Figure 14:
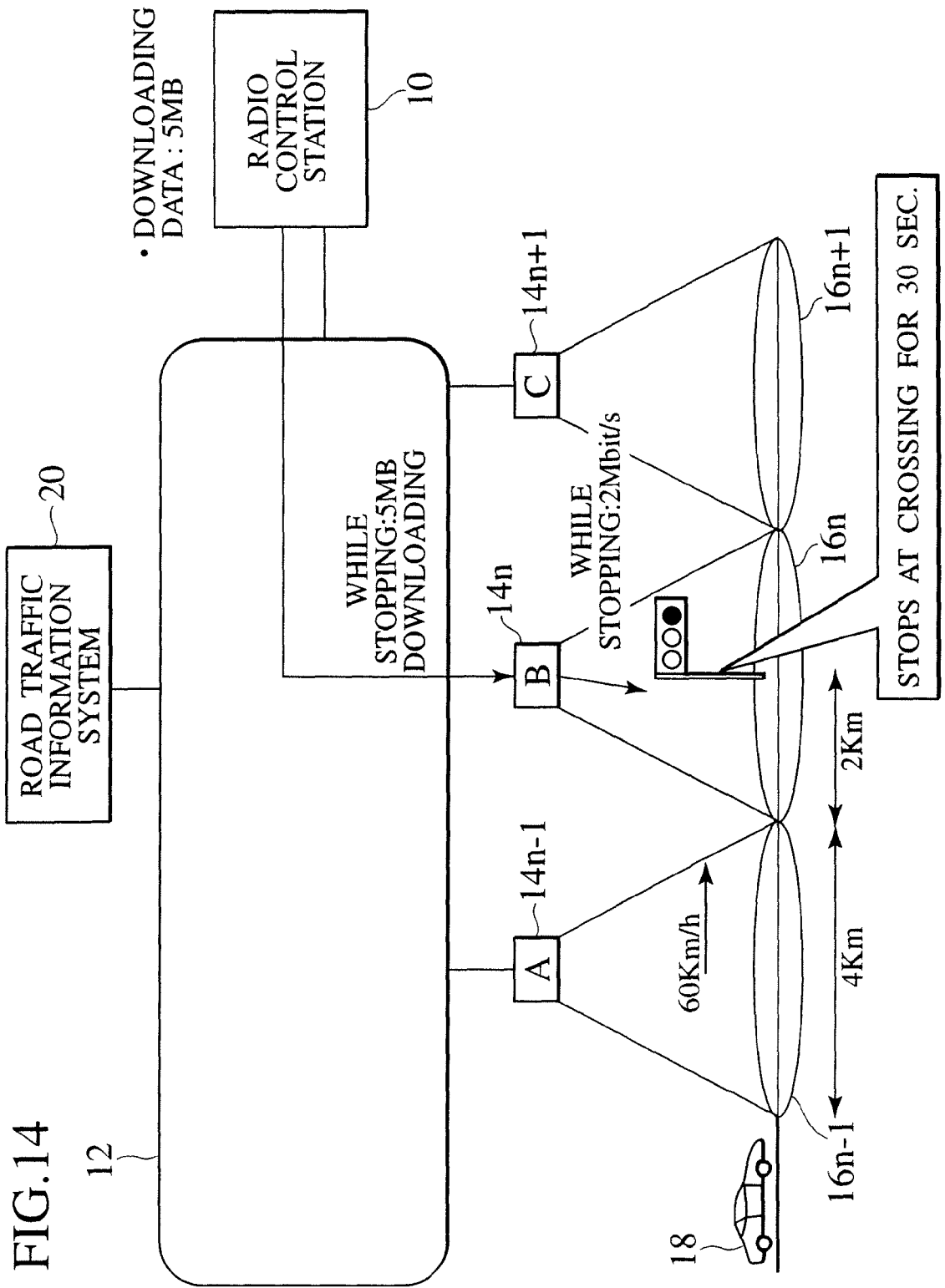
FIG. 14 is a diagram showing an outline of a radio communication method according to the fourth embodiment of the present invention in still another exemplary case.

FIG. 14 shows another exemplary case of estimating the amount of data that can be downloaded at each radio base station and predicting the moving route according to the estimated amount of data, when the signal light of the traffic signal at the crossing on the moving route is predicted as red, which is different from that of FIG. 13. In FIG. 14, it is also assumed that the radio terminal 18 receives the service as defined by the IMT-2000.

In FIG. 14, it is predicted that the radio terminal 18 will be stopping for 30 seconds because the signal light of the traffic signal is red at the crossing within the service area 16$n$ of the radio base station 14$n$. In this case, the radio control station 10 judges whether the downloading of the data (5 Mbytes) requested from the radio terminal 18 can be completed during that 30 seconds or not. In this example, the service is provided to the radio terminal 18 at the data communication speed of 2 Mbit/sec. for the stopping case as defined by the IMT-2000, so that the time required for the downloading of 5 Mbytes data is 5×8(Mbits)/2(Mbit/sec.)=20 seconds. Consequently, the radio control station 10 judges that the downloading of 5 Mbytes data can be completed while the radio terminal 18 is stopping at the crossing, and determines the delivery of 5 Mbytes downloading data to the radio base station 14$n$.

On the other hand, when it is judged that the downloading of the requested data cannot be completed while the radio terminal 18 is stopping at the crossing, the radio control station 10 determines to carry out the downloading of a part of the requested data while the radio terminal 18 is under the fast moving environment before reaching to the crossing.

Also, when it is judged that the downloading of the requested data can be completed while the radio terminal 18 is under the fast moving environment before the radio terminal 18 stops at the crossing, the radio control station 10 determines to carry out the downloading only under the fast moving environment without carrying out the downloading at the crossing, in order to shorten the downloading time.

Fifth Embodiment

Next, the fifth embodiment of the present invention will be described in detail.

In the third and fourth embodiments described above, the amount of downloading data to be transmitted to the radio terminal 18 at each radio base station 14 is estimated in advance by accounting for the time required for the re-transmission control or the redundant transmission control. However, if the radio channel quality becomes considerably poorer than the expected quality when the radio terminal 18 actually receives the downloading service, there is a possibility for the amount of data correctly downloaded from the radio base station 14 becomes less than the originally estimated amount. In such a case, there is a need to supplement the non-received data by having them re-transmitted from a radio base station with which the radio terminal 18 will become capable of communicating subsequently.

In order to realize such a supplement of the downloading data, in this fifth embodiment, the radio terminal 18 notifies the downloading data reception state up to that point to a next radio base station 14 when the radio terminal 18 moves to the service area 16 of the next radio base station 14. Upon receiving this reception state notice, the next radio base station 14 checks whether the non-received downloading data exists in the downloading data that are supposed to be received by the radio terminal 18 or not. If the non-received downloading data exists, the next radio base station 14 transmits the non-received downloading data in addition to the originally allocated downloading data, to the radio terminal 18.

Figure 15:
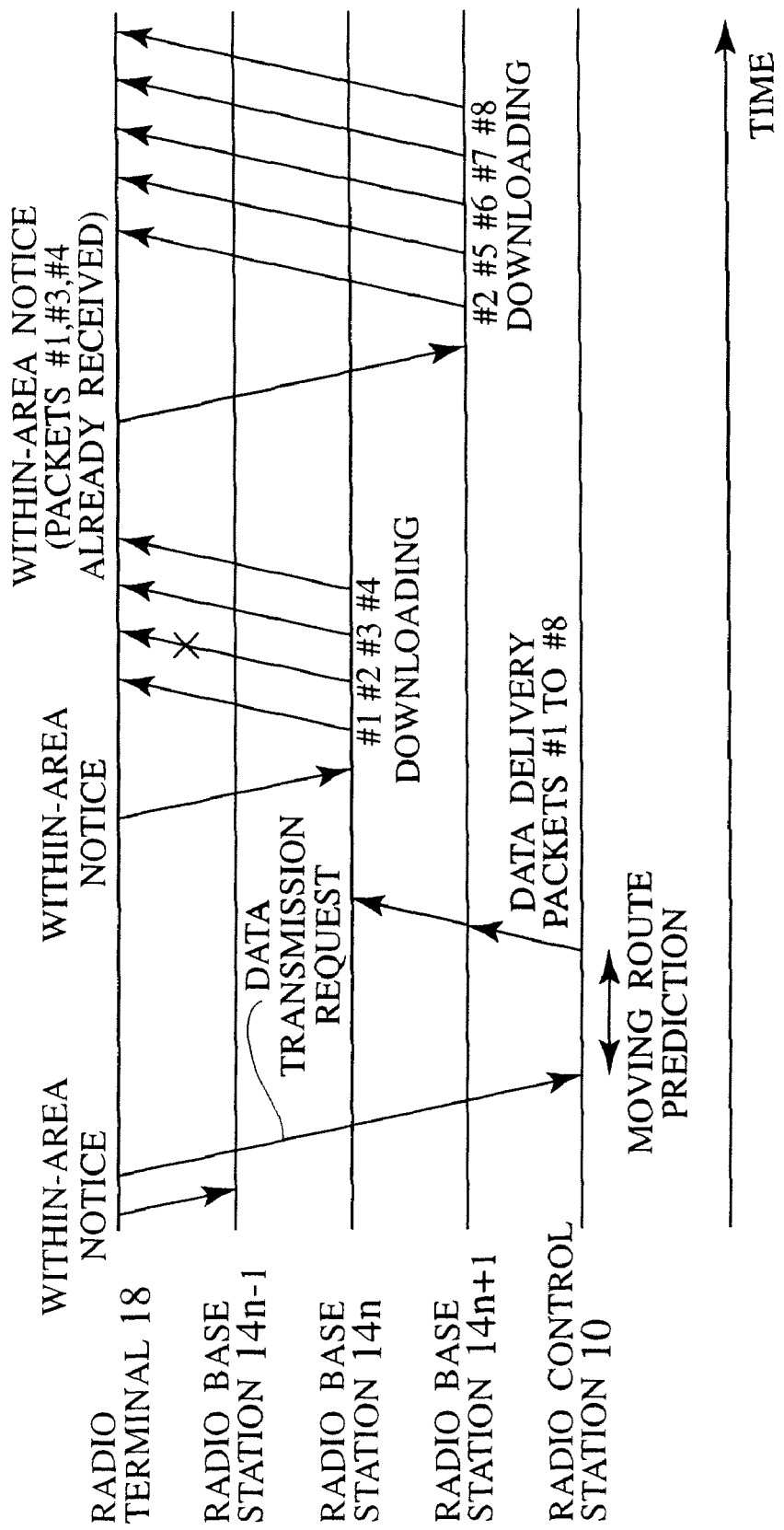
FIG. 15 is a diagram showing an outline of a radio communication method according to the fifth embodiment of the present invention in one exemplary case.

FIG. 15 shows an operation sequence among the radio control station 10, the radio base station 14 and the radio terminal 18 in the case of supplementing the non-received downloading data at the next radio base station 14. In FIG. 15, it is assumed that the downloading data to be transmitted to the radio terminal 18 are given by eight packets (packets #1 to #8).

In the example of FIG. 15, when the radio terminal 18 enters the service area 16$n$+1 of the next radio base station 14$n$+1, the radio terminal 18 notifies the downloading data reception state up to that point to the radio base station 14$n$+1 along with a message indicating that it is located within the service area 16$n$+1. More specifically, the radio terminal 18 notifies that the packets #1, #3 and #4 have already been received to the radio base station 14$n$+1. According to this reception state notice, the radio base station 14$n$+1 recognizes that the packet #2 is the non-received downloading data of the radio terminal 18. Consequently, the radio base station transmits the packet #2 in addition to the originally allocated packets #5 to #8 to the radio terminal 18.

Note that when the radio base station 14$n$+1 does not have the packet #2 to be re-transmitted, the radio base station 14$n$+1 notifies to the radio control station 10 that there is a need to re-transmit the packet #2 to the radio terminal 18. Upon receiving this notice, the radio control station 10 delivers the packet #2 to the radio base station 14$n$+1 or a radio base station with which the radio terminal 18 will become capable of communicating subsequently.

In this way, by notifying the downloading data reception state of the radio terminal 18 to the next radio base station, it becomes possible to supplement the unexpectedly lost downloading data easily at the next radio base station. As a result, it is possible to expect the further improvement of the reliability of the downloading service.

Sixth Embodiment

Next, the sixth embodiment of the present invention will be described in detail.

Figure 16:
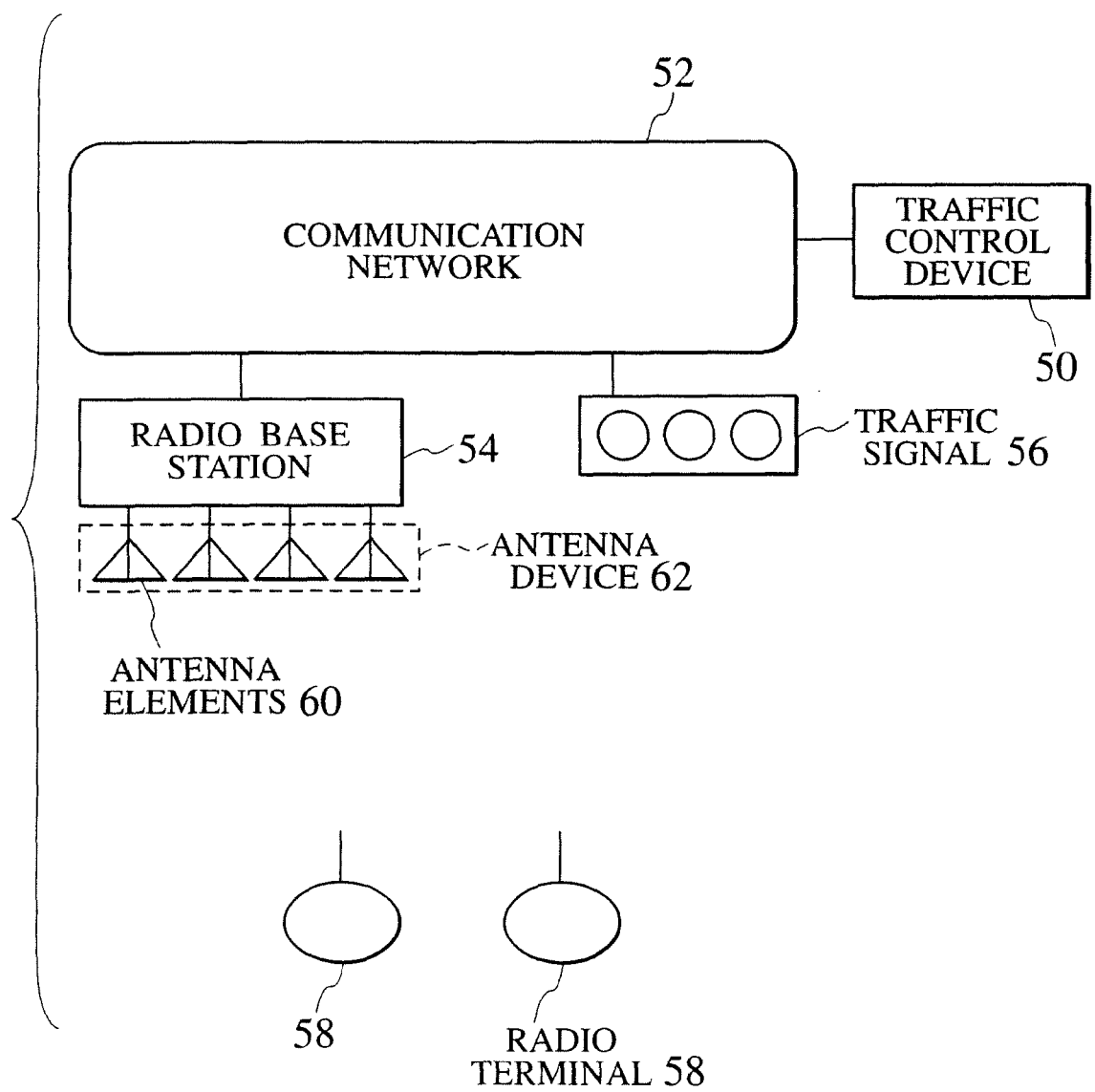
FIG. 16 is a block diagram showing a configuration of a radio communication system according to the sixth embodiment of the present invention.

FIG. 16 shows a configuration of a radio communication system according to the sixth embodiment of the present invention. As shown in FIG. 16, this radio communication system comprises: a traffic control device 50; a communication network 52 such as the Internet to which the traffic control station 50 is connected; a radio base station 54 and a traffic signal 56 which are connected through the communication network 52; and a radio terminal 58 for carrying out radio communications with the radio base station 14.

The radio base station 54 has at least an antenna device 62 which is formed by a plurality of antenna elements 60 and capable of forming a plurality of beam patterns, a modulation unit (not shown) for modulating transmission data, and a demodulation unit (not shown) for demodulating received radio signals. Of course, it is also possible to use a configuration using a modulation/demodulation unit in which the modulation unit and the demodulation unit are integrated.

Then, a plurality of beam areas (not shown) formed by the beam patterns of the radio base station 54 constitute the service area of this radio base station 54. The radio base station 54 executes transmission/reception of radio signals with respect to the radio terminal 58 having a radio signal transmission/reception function which is located within the service area, by forming a plurality of beam patterns.

The radio terminal 58 can be a vehicle running on road or the like or a portable terminal (mobile phone, cellular phone) or the like on that vehicle.

Figure 17:
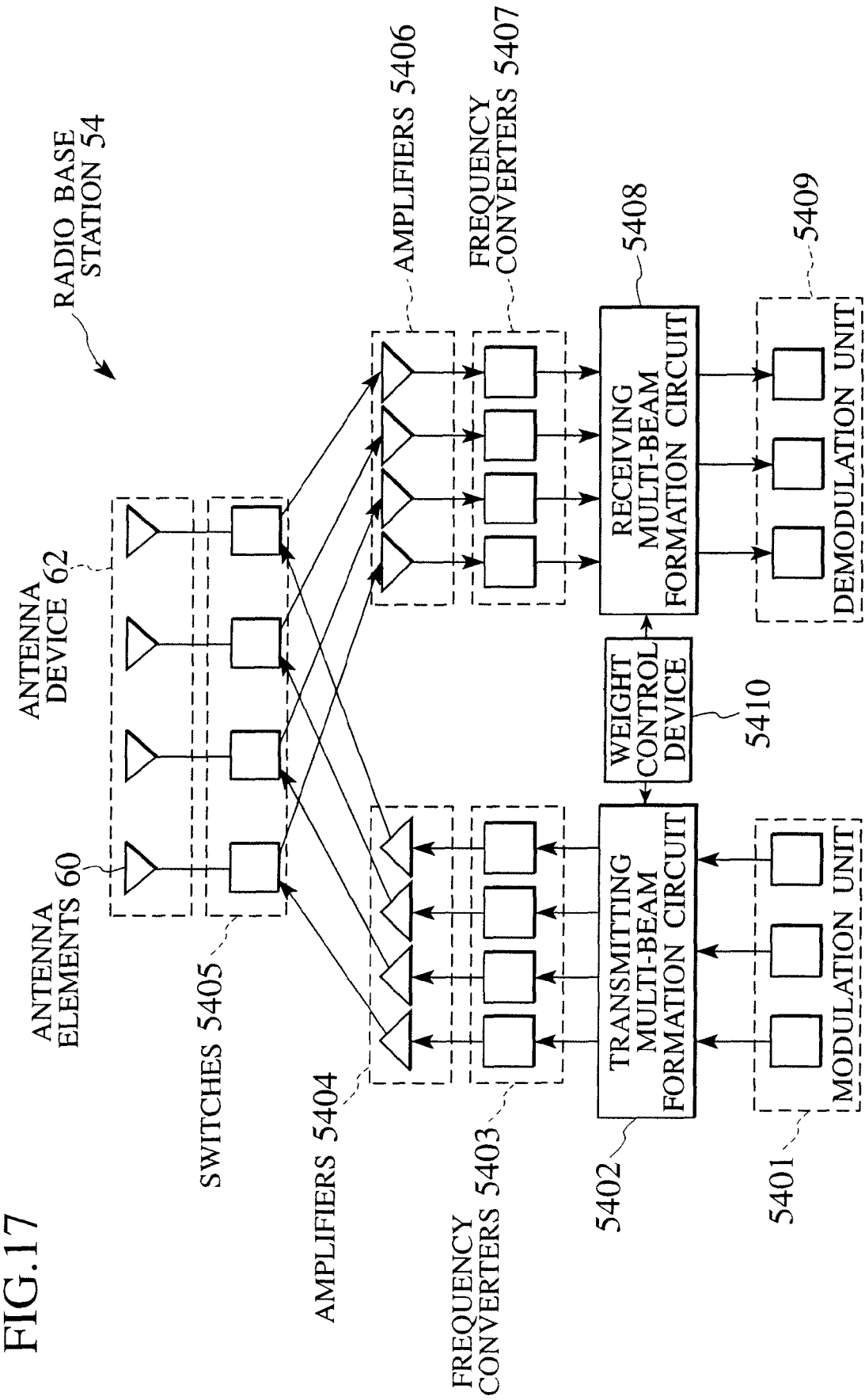
FIG. 17 is a block diagram showing a detailed configuration of a radio base station in the radio communication system of FIG. 16.

FIG. 17 shows a detailed configuration of the radio base station 54. In FIG. 17, the number of antenna elements 60 in the antenna device 62 is assumed to be four and the antenna device 62 is assumed to be shared by a transmitting side and a receiving side, for the sake of the simplicity.

As shown in FIG. 17, switches 5405 are connected to the antenna elements 60 in correspondences to respective antenna elements. Then, the switching between transmission and reception of the antenna device 60 is realized by switching the switches 5405.

In the receiving side, the signals received by the antenna elements 60 are entered into amplifiers (low noise amplifiers) 5406 corresponding to the respective antenna elements 60 through the switches 1006. The entered received signals are amplified by the amplifiers 5406.

The amplified received signals are applied with a frequency conversion from an RF band into an IF band or a baseband by frequency converters 5407. In this IF band or the baseband, the receiving multi-beam formation circuit 5408 forms a plurality of receiving beams simultaneously by carrying out a prescribed weighting with respect to each received signal outputted by each frequency converter 5407. This weighting is executed according to a weighting control device 5410.

Figure 18:
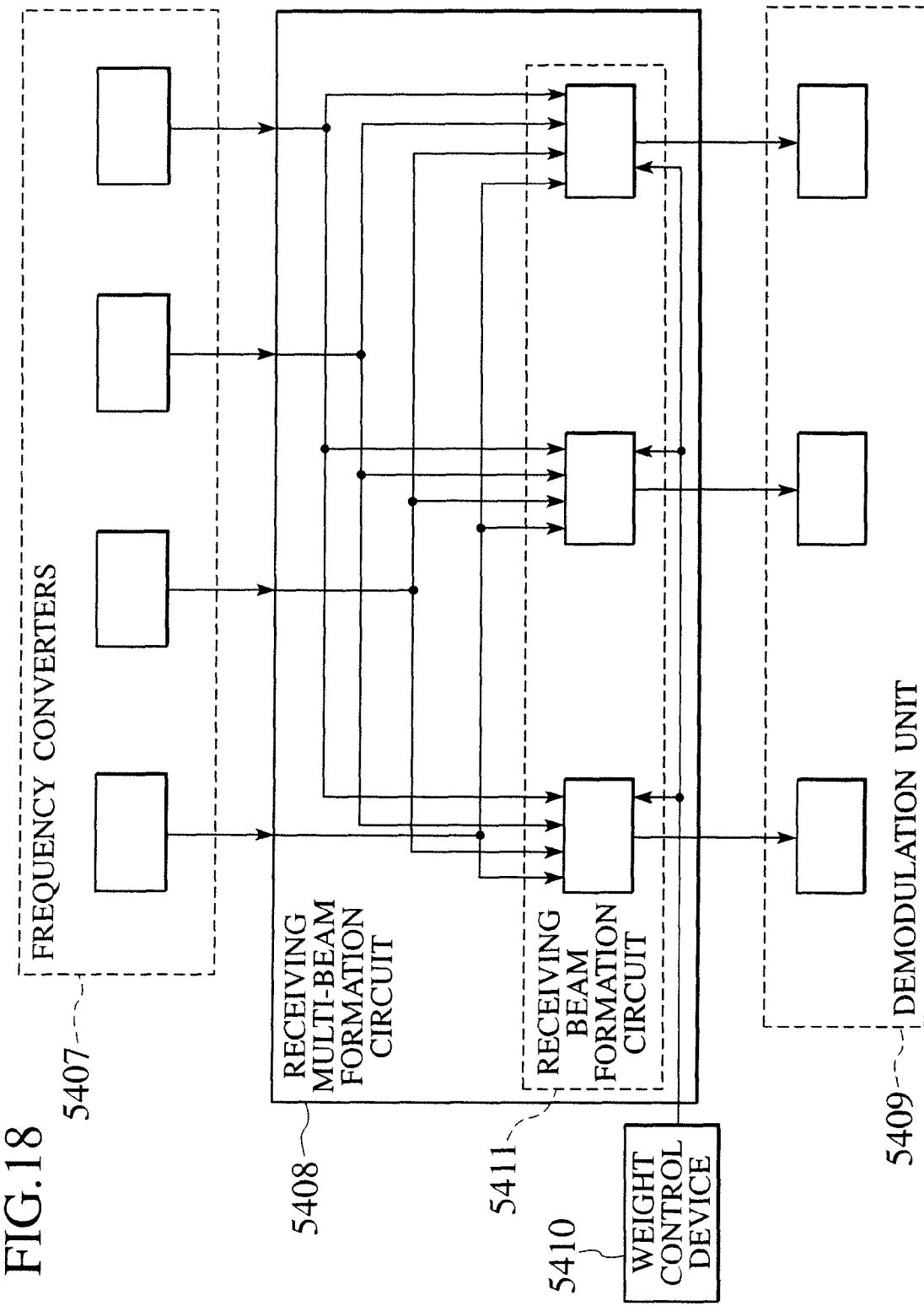
FIG. 18 is a block diagram showing a configuration of a receiving multi-beam formation circuit in the radio base station of FIG. 17.

FIG. 18 shows a detailed configuration of the receiving multi-beam formation circuit 5408 of FIG. 17. In FIG. 18, the number of beams to be simultaneously formed is assumed to be three. The received signals outputted from each frequency converter 5407 are entered into a corresponding receiving beam formation circuit 5411. Each receiving beam formation circuit 5411 combines the entered received signals by weighting them according to weights set by the weight control device 5410. Then, each receiving beam formation circuit 5411 outputs weighted and combined signals to a corresponding demodulation unit 5409.

Figure 19:
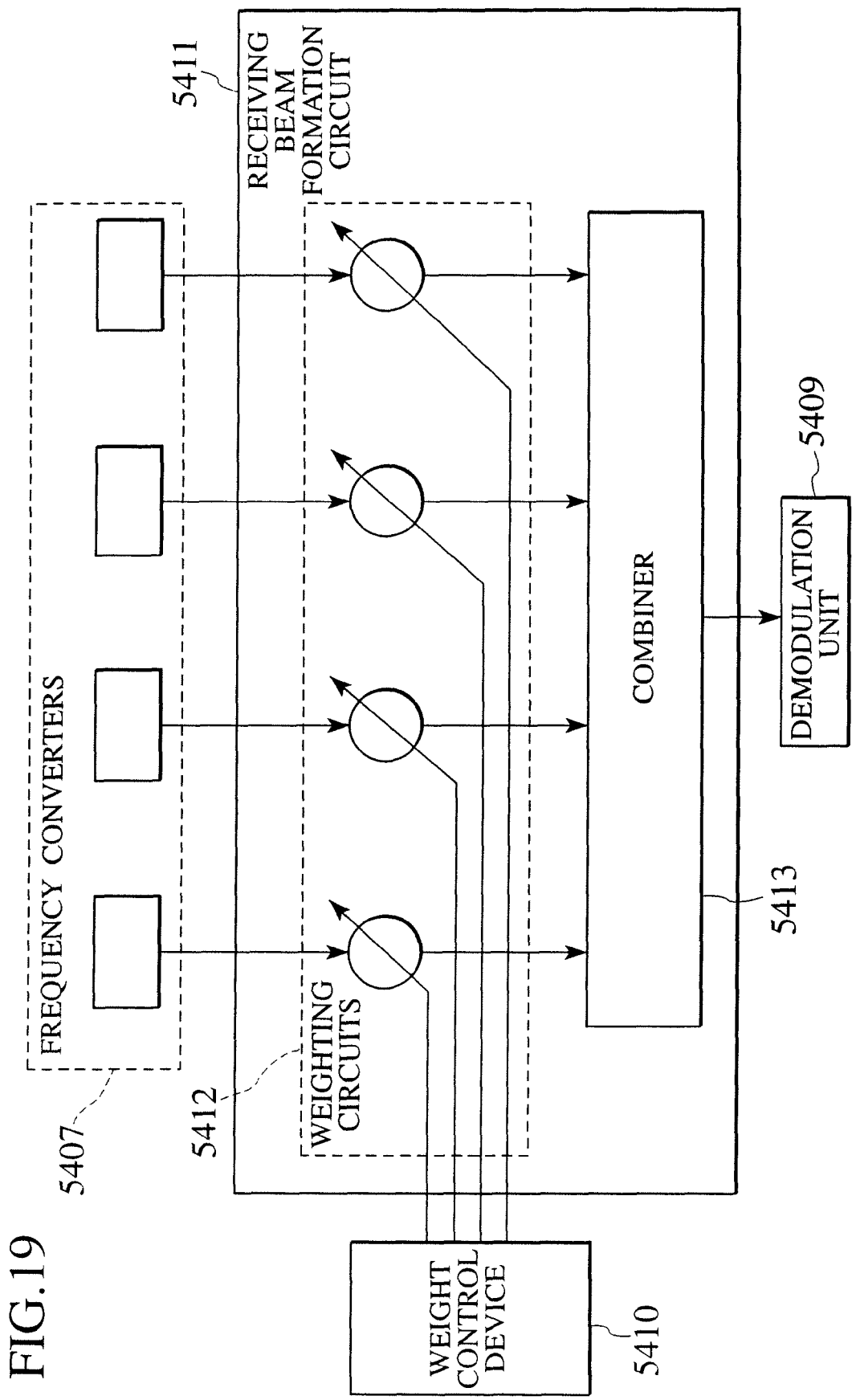
FIG. 19 is a block diagram showing a configuration of a receiving beam formation circuit in the receiving multi-beam formation circuit of FIG. 18.

FIG. 19 shows a detailed configuration of a receiving beam formation circuit 5411 of FIG. 18. The received signals outputted from each frequency converter 5407 are entered into a corresponding weighting circuit 5412, where the prescribed weighting is carried out. Here, the method of weighting at the weighting circuit 5412 can be an amplitude weighting, a phase weighting, or an amplitude and phase weighting, for example. The weighted received signals are them combined by a combiner 5413.

On the other hand, in the transmitting side, the transmission signals modulated by the modulation units 5401 are outputted to the transmitting multi-beam formation circuit 5402 as shown in FIG. 17. The transmitting multi beam formation circuit 5402 forms a plurality of receiving beams simultaneously by carrying out a prescribed weighting with respect to each transmission signal modulated by each modulation unit 5401. This weighting is also executed according to the weighting control device 5410. The amount of weight is set up such that the beam patterns of the transmitting side and the receiving side coincide with each other.

Figure 20:
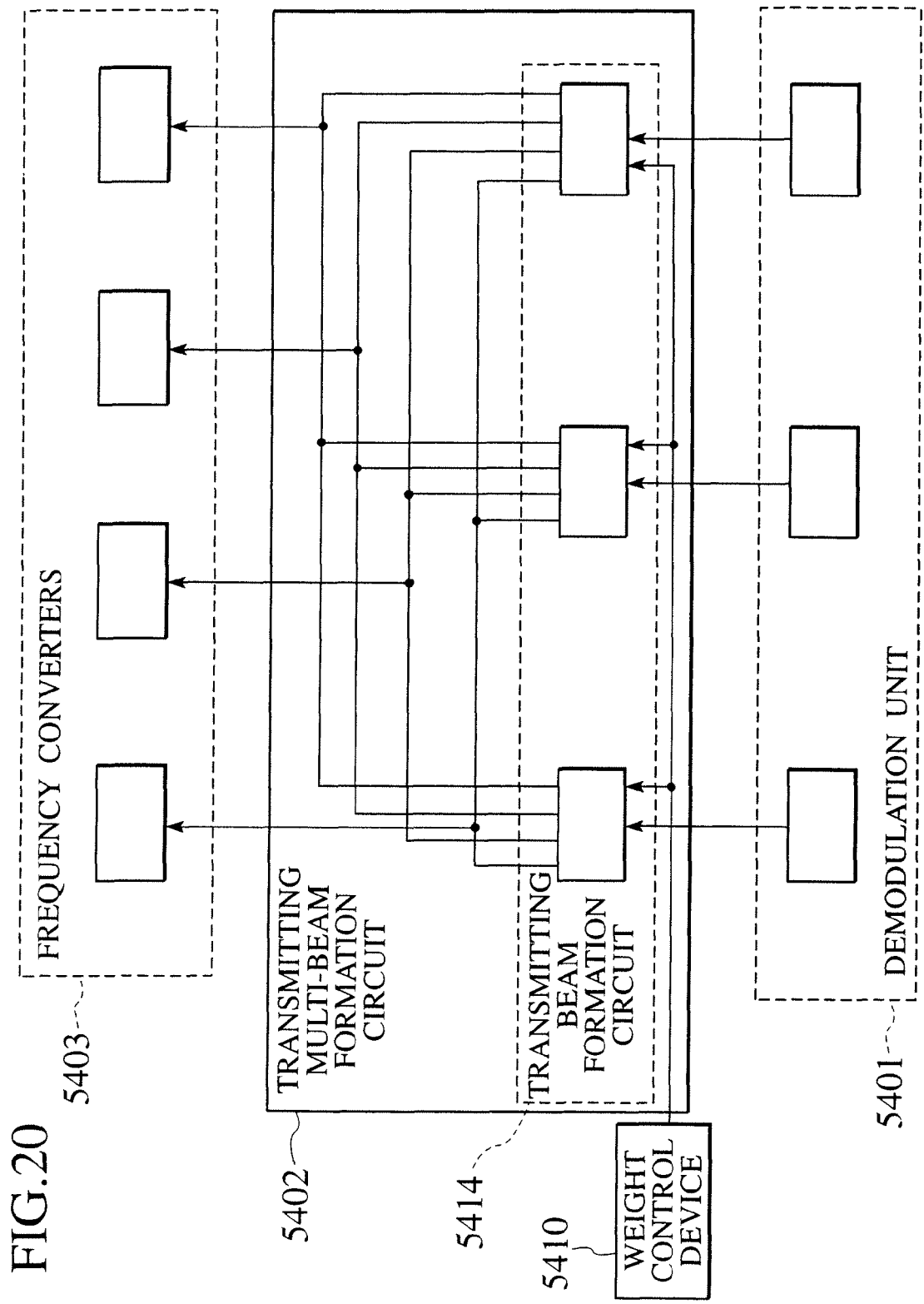
FIG. 20 is a block diagram showing a configuration of a transmitting multi-beam formation circuit in the radio base station of FIG. 17.

FIG. 20 shows a detailed configuration of the transmitting multi-beam formation circuit 5402 of FIG. 19. The transmission signals outputted from each modulation unit 5401 are entered into a corresponding transmitting beam formation circuit 5414. Each transmitting beam formation circuit 5414 combines the entered transmission signals by weighting them according to weights set by the weight control device 5410. Then, each transmitting beam formation circuit 5414 outputs weighted and combined signals to a corresponding frequency converter 5403.

Figure 21:
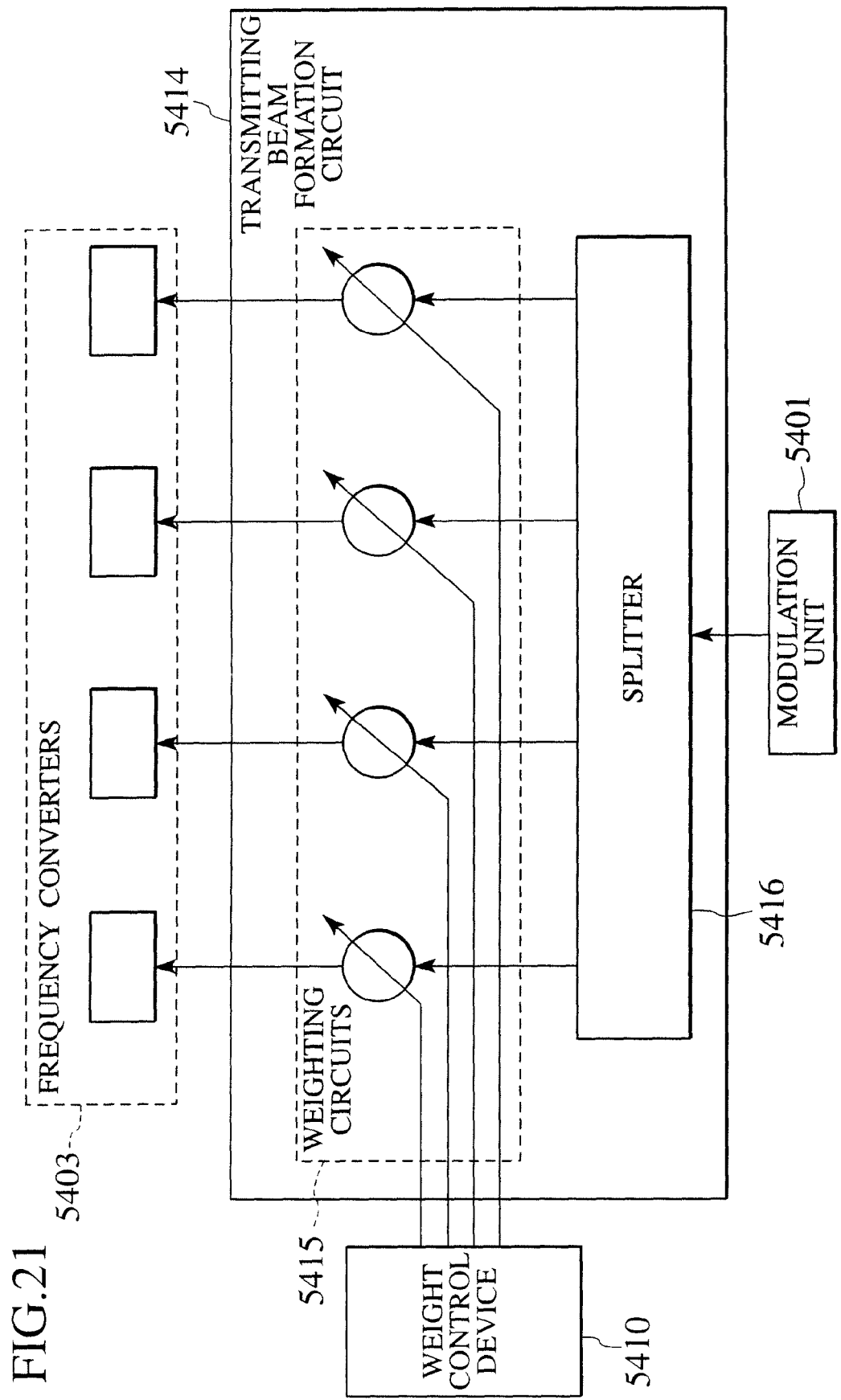
FIG. 21 is a block diagram showing a configuration of a transmitting beam formation circuit in the transmitting multi-beam formation circuit of FIG. 20.

FIG. 21 shows a detailed configuration of the transmitting beam formation circuit 5414 of FIG. 20. The transmission signals outputted from each modulation unit 5401 are split by a splitter 5416, and each split signal is entered into a corresponding weighting circuit 5415, where the prescribed weighting is carried out.

Then, as shown in FIG. 21, each one of four beams 35 formed by the transmitting multi-beam formation circuit 5402 is applied with a frequency conversion into the RF band by a corresponding frequency converter 5403, and each frequency converted transmission signal is amplified by a corresponding amplifier (high output amplifier) 5404. Then, the transmission signals are transmitted from the corresponding antenna elements 60 through the switches 5405.

In the radio communication system of this sixth embodiment, the radio base station 54 is connected with the traffic control device 50 through the communication network 52, and receiving the control information regarding the signal light of the traffic signal 56 from the traffic control device 50. The radio base station 54 derives an appropriate amount of weight for a location of the radio base station 54 by utilizing that control information at the weight control device 5410. Then, the bean pattern formed by the antenna device 60 is optimized by using the derived amount of weight.

Here, the optimization of the beam pattern is made such that the directivity of the beams is pointed toward a direction of the traffic signal 56 with a "red" signal light on, and the directivity of the beams is set to be null for a direction of the traffic signal 56 with a "green" signal light on.

Figure 22:
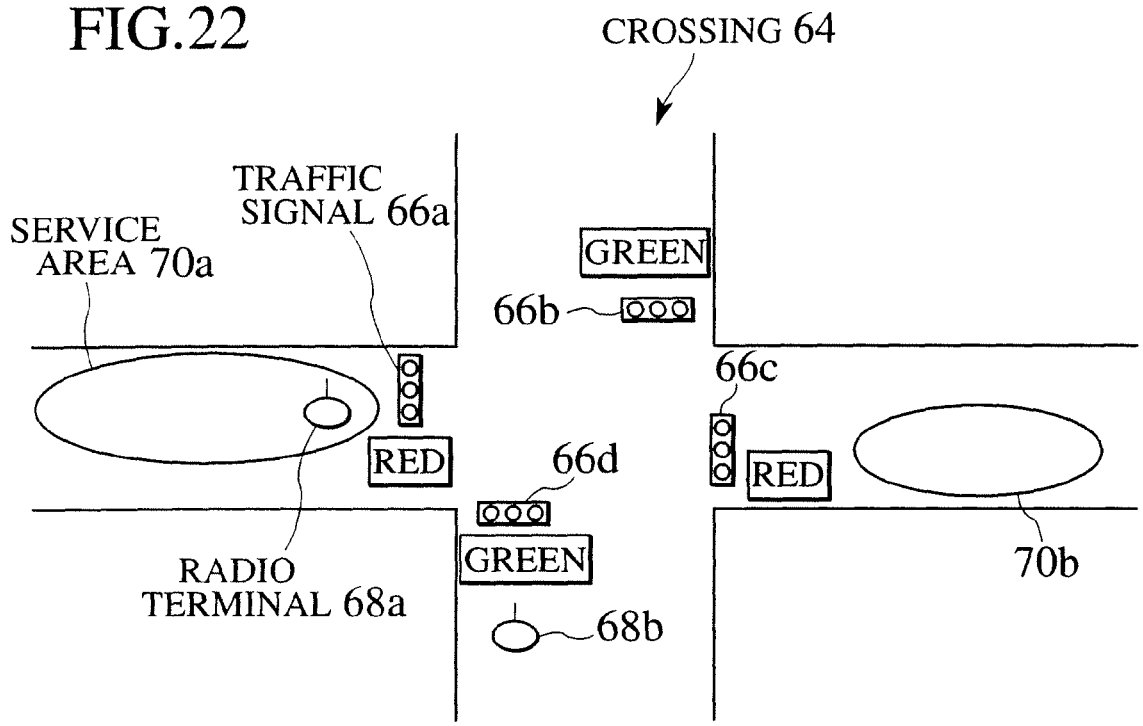
FIG. 22 is a diagram showing one exemplary beam pattern to be formed by the radio base station of FIG. 17 in a vicinity of a crossing.

For example, in the case where the radio base station 54 is provided in a vicinity of a crossing 64 shown in FIG. 22, the radio base station 54 points the directivity of the beam pattern toward directions of traffic signals 66*a* and 66*c* with the red signal light on, so as to form service areas 70*a* and 70*b*. In this way, the radio base station 54 becomes capable of communicating with a vehicle 68*a* that is stopping because of the red signal light.

Figure 23:
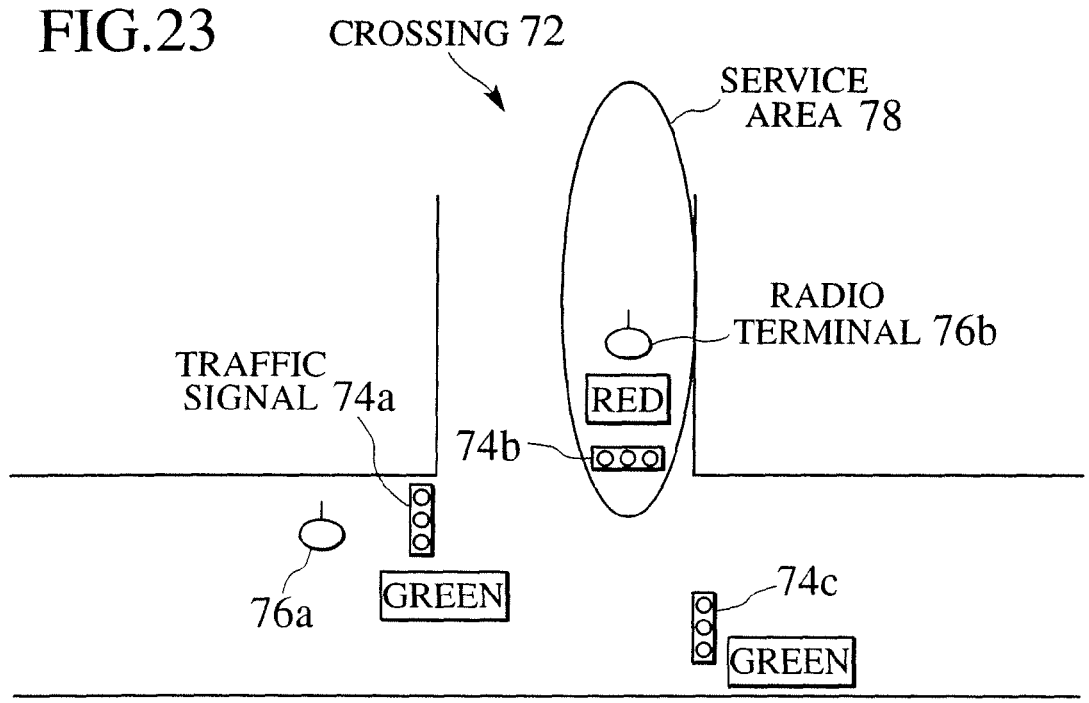
FIG. 23 is a diagram showing another exemplary beam pattern to be formed by the radio base station of FIG. 17 in a vicinity of a crossing.

Also, in the case where the radio base station 54 is provided in a vicinity of a crossing 72 shown in FIG. 23, 35 the radio base station 54 points the directivity of the beam pattern toward a direction of a traffic signal 74*b* with the red signal light on, so as to form a service area 78. In this way, the radio base station 54 becomes capable of communicating with a vehicle 76*b* that is stopping because of the red signal light. Note that the radio base station 54 may be provided on the traffic signal 74*b* or at a place other than the location of the traffic signal 74*b*.

Here, the method for forming the beam pattern is not limited to any specific method. The traffic control information and the amounts of weights for beams are set in correspondence by some method and this correspondence information is stored in the weight control device 5410. Then, the weight control device 5410 sets the appropriate amounts of weights to the transmitting multi-beam formation circuit 5402 and the receiving multi-beam formation circuit 5408 according to the traffic control information provided from the traffic control device 50 through the communication network 52.

In this way, according to the sixth embodiment, the directivity of the beams is pointed toward a direction of a traffic signal with a red signal light on, so that it becomes possible to improve the antenna gain with respect to the radio terminal that is stopping or about to stop (slowly moving). For this reason, it is possible to improve the quality of radio communications with the communication target radio terminal.

As described above, according to the present invention, the moving route of the mobile terminal is predicted and the base station capable of transmitting data to the mobile terminal on the predicted moving route is selected. Then, the data requested from the mobile terminal are delivered to the selected base station in advance. For this reason, it becomes possible to shorten the time required for establishing a connection between the mobile terminal and a new access target base station at a time of the handover, and consequently it becomes possible to transmit the data to the mobile terminal fast, without a failure.

Thus, according to the present invention, it becomes possible to provide radio communication system and method in which a fast downloading service can be provided without a failure, with respect to a moving body capable of executing a fast moving such as automobile.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the radio control station of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A radio communication system, comprising:
a plurality of radio base stations having respective service areas;
a mobile radio terminal configured to transmit a data transmission request through one radio base station and receive requested data through at least one of the plurality of radio base stations;
a radio control station connected with the plurality of radio base stations and including:
a moving route prediction unit configured to predict a moving route of the mobile radio terminal according to a terminal location information obtained from the mobile radio terminal upon receiving the data transmission request; and
a server unit configured to select radio base stations which have service areas containing at least a part of the moving route predicted by the moving route prediction unit, and to estimate an amount of the requested data to be delivered to the selected radio base stations according to a signal change pattern to be predicted of traffic signals within the service areas of the selected radio base stations.

2. The radio communication system of claim 1, wherein the terminal location information is an identifier of the one radio base station through which the data transmission request is transmitted, which is contained in the data transmission request;
and the moving route prediction unit predicts the moving route of the mobile radio terminal from information on a location of the one radio base station identified by the identifier.

3. The radio communication system of claim 1, wherein the mobile radio terminal has a global positioning system function, and periodically transmits the terminal location information containing a longitude and a latitude of a current location of the mobile radio terminal obtained by the global positioning system function, to the radio control station.

4. The radio communication system of claim 1, wherein each radio base station has:
a beam formation unit configured to simultaneously form a plurality of space dividing beams; and
an antenna device having a plurality of antenna elements configured to send the requested data to the mobile radio terminal by transmitting one of the plurality of space dividing beams toward the mobile radio terminal.

5. A radio control station in a radio communication system formed by a plurality of radio base stations having respective service areas and a mobile radio terminal configured to transmit a data transmission request through one radio base station and receive requested data through at least one of the plurality of radio base stations, the radio control station comprising;
a moving route prediction unit configured to predict a moving route of the mobile radio terminal according to a terminal location information obtained from the mobile radio terminal upon receiving the data transmission request from the mobile radio terminal through the one radio base station; and
a server unit configured to select radio base stations which have service areas containing at least a part of the moving route predicted by the moving route prediction unit, and to estimate an amount of the requested data to be delivered to the selected radio base stations according to a signal change pattern to be predicted of traffic signals within the service areas of the selected radio base stations.

6. The radio control station of claim 5, wherein the terminal location information is an identifier of the one radio base station through which the data transmission request is transmitted, which is contained in the data transmission request; and
the moving route prediction unit predicts the moving route of the mobile radio terminal from information on a location of the one radio base station identified by the identifier.

7. The radio control station of claim 5, wherein the moving route prediction unit periodically receives the terminal location information containing a longitude and a latitude of a current location of the mobile radio terminal obtained by a global positioning system function provided in the mobile radio terminal.

8. The radio control station of claim 5, wherein the moving route prediction unit predicts the moving route according to the terminal location information and traffic information including at least one of a moving speed of the mobile radio terminal, a legal speed limit on the moving route, and a current moving speed of vehicles existing on the moving route.

9. A radio communication method in a radio communication system formed by a plurality of radio base stations having respective service areas and a mobile radio terminal configured to transmit a data transmission request through one radio base station and receive requested data through at least one of the plurality of radio base stations, the radio communication method comprising;
predicting a moving route of the mobile radio terminal according to a terminal location information obtained from the mobile radio terminal upon receiving the data transmission request from the mobile radio terminal through the one radio base station at a radio control station;
selecting radio base stations which have service areas containing at least a part of the moving route predicted by the predicting at the radio control station; and
estimating an amount of the requested data to be delivered to the selected radio base stations according to a signal change pattern to be predicted of traffic signals within the service areas of the selected radio base stations.

10. A non-transitory computer usable medium having computer readable program codes embodied therein for causing a computer to function as a radio control station in a radio communication system formed by a plurality of radio base stations having respective service areas and a mobile radio terminal configured to transmit a data transmission request through one radio base station and receive requested data through at least one of the plurality of radio base stations, the computer readable program codes include:
a first computer readable program code for causing said computer to predict a moving route of the mobile radio terminal according to a terminal location information obtained from the mobile radio terminal upon receiving the data transmission request from the mobile radio terminal through the one radio base station; and a second computer readable program code for causing said computer to select those radio base stations which have service areas containing at least a part of the moving route predicted by the moving route prediction unit, and for estimating an amount of the requested data to be delivered to the selected radio base stations according to a signal change pattern to be predicted of traffic signals within the service areas of the selected radio base stations.

11. The radio communication system of claim 1, wherein the server unit estimates an amount of the requested data to be delivered to the selected radio base stations according to a signal change pattern to be predicted of traffic signals within the service areas of the selected radio base stations such that a data communication speed increases when a traffic signal is predicted to indicate a stop.

12. The radio control station of claim 5, wherein the server unit estimates an amount of the requested data to be delivered to the selected, radio base stations according to a signal change pattern to be predicted of traffic signals within the service areas of the selected radio base stations such that a data communication speed increases when a traffic signal is, predicted to indicate a stop.

13. The radio communication method of claim 9, wherein an amount of the requested data to be delivered to the selected radio base stations is estimated according to a signal change pattern to be predicted of traffic signals within the service areas of the selected radio base stations such that a data communication speed increases when a traffic signal is predicted to indicate a stop.

14. The non-transitory computer usable medium of claim 10, wherein the second computer readable program code causes said computer to estimate an amount of the requested data to be delivered to the selected radio base stations according to a signal change pattern to be predicted of traffic signals within the service areas of the selected radio base stations such that a data communication speed increases when a traffic signal is predicted to indicate a stop.

* * * * *